US012322423B2

United States Patent
Sudo

(10) Patent No.: US 12,322,423 B2
(45) Date of Patent: Jun. 3, 2025

(54) DISK DEVICE

(71) Applicants:Kabushiki Kaisha Toshiba, Tokyo (JP); Toshiba Electronic Devices & Storage Corporation, Tokyo (JP)

(72) Inventor: Daisuke Sudo, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/398,554

(22) Filed: Dec. 28, 2023

(65) Prior Publication Data

US 2025/0036294 A1 Jan. 30, 2025

(30) Foreign Application Priority Data

Jul. 26, 2023 (JP) ................................. 2023-121460

(51) Int. Cl.
*G11B 5/55* (2006.01)
*G11B 19/28* (2006.01)

(52) U.S. Cl.
CPC ............ *G11B 5/5547* (2013.01); *G11B 19/28* (2013.01)

(58) Field of Classification Search
None
See application file for complete search history.

(56) References Cited

U.S. PATENT DOCUMENTS

| | | | | |
|---|---|---|---|---|
| 5,434,991 A | * | 7/1995 | Maeda | G11B 27/3063 |
| 5,748,583 A | * | 5/1998 | Baba | G11B 7/08529 369/53.37 |
| 5,995,318 A | * | 11/1999 | Hasegawa | G11B 21/085 360/78.04 |
| 6,009,067 A | * | 12/1999 | Hayashi | G11B 20/10009 |
| 6,038,096 A | | 3/2000 | Zhang et al. | |
| 6,608,460 B1 | * | 8/2003 | Okada | G11B 5/5534 318/567 |
| 7,110,214 B1 | | 9/2006 | Tu et al. | |
| 7,199,966 B1 | | 4/2007 | Tu et al. | |
| 9,275,667 B1 | | 3/2016 | Abrishamchian et al. | |
| 10,008,227 B1 | | 6/2018 | Sudo et al. | |
| 2001/0015944 A1 | * | 8/2001 | Takahashi | G11B 27/11 |
| 2001/0043530 A1 | * | 11/2001 | Nakatsuka | G11B 27/36 |
| 2004/0145978 A1 | * | 7/2004 | Yamamoto | G11B 7/094 369/47.52 |
| 2012/0236432 A1 | * | 9/2012 | Sudo | G11B 5/5547 360/75 |
| 2023/0245683 A1 | * | 8/2023 | Sudo | G11B 5/5569 360/77.04 |

* cited by examiner

*Primary Examiner* — Peter Vincent Agustin
(74) *Attorney, Agent, or Firm* — Kim & Stewart LLP

(57) ABSTRACT

According to one embodiment, in a disk device, a controller, when the rotation waiting time is present, increases an absolute value of a motor current in a fourth section in a second period in which a head is accelerated or decelerated, changes the absolute value of the motor current at a third average change rate in a fifth section after the fourth section in the second period, decreases the absolute value of the motor current at a fourth average change rate steeper than the third average change rate in a sixth section after the fifth section in the second period, and decreases the absolute value of the motor current at a fifth average change rate steeper than the fourth average change rate in a seventh section after the sixth section in the second period.

20 Claims, 17 Drawing Sheets

DISK DEVICE

CROSS-REFERENCE TO RELATED APPLICATIONS

This application is based upon and claims the benefit of priority from Japanese Patent Application No. 2023-121460, filed on Jul. 26, 2023; the entire contents of which are incorporated herein by reference.

FIELD

Embodiments described herein relate generally to a disk device.

BACKGROUND

A disk device having a motor achieves a predetermined control operation by supplying drive power to the motor. At this time, it is desirable to reduce power consumption in the disk device.

DETAILED DESCRIPTION

In general, according to one embodiment, there is provided A disk device including a head, a disk, a motor and a controller. The disk has a recording surface. The motor causes the head to seek along the recording surface. The controller controls the motor. The controller, when a rotation waiting time is absent from when the head reaches a target track of the disk to when the head reaches a target sector, increases an absolute value of a motor current in a first section in a first period in which the head is accelerated or decelerated, changes the absolute value of the motor current at a first average change rate in a second section after the first section in the first period, and decreases the absolute value of the motor current at a second average change rate that is steeper than the first average change rate in a third section after the second section in the first period. The controller, when the rotation waiting time is present, increases the absolute value of the motor current in a fourth section in a second period in which the head is accelerated or decelerated, changes the absolute value of the motor current at a third average change rate in a fifth section after the fourth section in the second period, decreases the absolute value of the motor current at a fourth average change rate steeper than the third average change rate in a sixth section after the fifth section in the second period, and decreases the absolute value of the motor current at a fifth average change rate steeper than the fourth average change rate in a seventh section after the sixth section in the second period.

Exemplary embodiments of a disk device will be explained below in detail with reference to the accompanying drawings. The present invention is not limited to the following embodiments.

EMBODIMENT

The disk device according to the embodiment includes a motor and achieves a predetermined control operation by supplying drive power to the motor, but measures are taken to reduce power consumption in the disk device.

Figure 1:
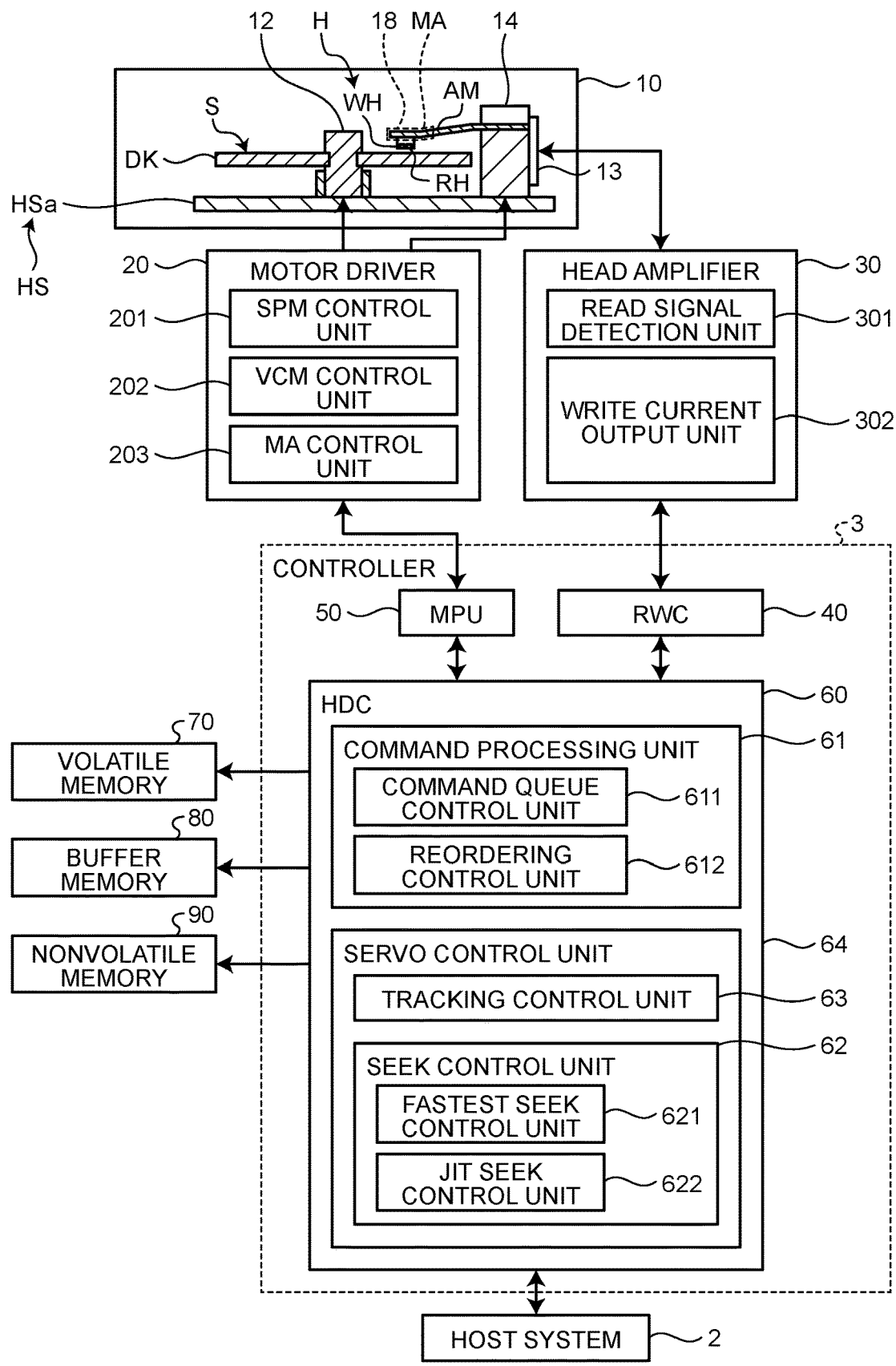
FIG. 1 is a diagram illustrating a configuration of a disk device according to an embodiment.

As illustrated in FIG. 1, the disk device 1 includes a head disk assembly (HDA) 10, a motor driver 20, a head amplifier 30, a controller 3, a volatile memory 70, a buffer memory 80, and a nonvolatile memory 90. FIG. 1 is a diagram illustrating a configuration of the disk device 1. The controller 3 includes a read/write channel (RWC) 40, a microprocessor unit (MPU) 50, and a hard disk controller (HDC) 60.

The HDA 10 includes a case 10a, a head H, an arm AM, a disk DK, a spindle motor 12, a voice coil motor (VCM) 13, a bearing 14, and a housing HS. A lower case HSa and an upper case HSb (not illustrated) are fitted to the housing HS. The head H, the arm AM, the disk DK, the spindle motor 12, the voice coil motor (VCM) 13, and the bearing 14 are housed in the housing HS.

The disk DK has a recording surface S on which data is recorded on each of the front surface and the back surface. The disk DK is rotationally driven by the spindle motor 12. The disk device 1 is provided with a plurality of disks DK. In FIG. 1, for the sake of simplicity, a configuration in which one disk DK is provided is illustrated. Further, physical addresses that are position information indicating physical positions on the recording surfaces S are set on all the recording surfaces S used in the disk device 1. The spindle motor 12 is driven by current (or voltage) supplied from the motor driver 20.

The head H is provided for each recording surface S of the disk DK. The head H includes a write head WH and a read head RH. The write head WH is used to write data to the disk DK. The read head RH is used to read data from the disk DK.

The arm AM supports the head H and is provided for each head H. The VCM 13 is driven by current (or voltage) supplied from the motor driver 20. The arm AM and the VCM 13 constitute an actuator. The actuator drives the VCM 13 to seek the arm AM in a circumferential direction around the bearing 14, and controls positioning of the head H on the recording surface S of the disk DK. The arm AM may further be provided with a microactuator MA that can be driven independently of the VCM 13 via a suspension 15 (see FIG. 2).

The motor driver 20 controls each movable part of the HDA 10 under the control of the controller 3. The motor driver 20 includes an SPM control unit 201, a VCM control unit 202, and an MA control unit 203.

The SPM control unit 201 supplies a current (or voltage) to the spindle motor 12 to drive the spindle motor 12 at a predetermined rotation speed.

The VCM control unit 202 supplies a current (or voltage) to the VCM 13, drives an actuator, and controls positioning of the head H in a radial direction of the disk DK.

The MA control unit 203 supplies a current (or voltage) to the microactuator MA, drives the microactuator MA, and finely adjusts the position of the head H in the radial direction of the disk DK.

The head amplifier 30 causes a write signal (current) corresponding to write data input from the RWC 40 to flow to the head H. In addition, the head amplifier 14 amplifies a read signal output from the head H (read data read from the disk DK by the head H) and supplies the amplified read signal to the RWC 40.

The RWC 40 is a signal processing circuit. The RWC 40 encodes (code-modulates) write data input from the HDC 60 and outputs the encoded write data to the head amplifier 30. Further, the RWC 40 decodes (code-demodulates) read data from the read signal transmitted from the head amplifier 30, and outputs the decoded read data to the HDC 60.

The MPU 50 performs overall control of the disk device 1 according to firmware stored in the nonvolatile memory 90 or the disk DK. The firmware includes initial firmware that is first executed when the disk device 1 is activated and control firmware used for a normal operation of the disk device 1.

Note that the controller 3 including the RWC 16, the HDC 60, and the MPU 50 can be configured as a one-chip integrated circuit (system on chip). The package of the controller 3 may be disposed on a printed circuit board outside the case of the HDA 10.

The HDC 60 performs control of transmission and reception of data with a host system 2 via an I/F bus, and the like. The HDC 60 includes a host interface (host I/F) circuit (not illustrated). The HDC 60 receives a command from the host system 2, performs command processing, and performs servo control including seek control and tracking control according to a result of the command processing.

The HDC 60 includes a command processor 61 and a servo control unit 64.

Upon receiving a write command including a logical address and write data from the host system 2, the command processor 61 performs command processing on the write command. The command processor 61 converts the logical address included in the write command into a physical address. The command processor 61 obtains a target track and a target sector according to the logical address. The command processor 61 supplies command information including the target track and the target sector to the servo control unit 64. The command processor 61 supplies the write data to the head H via the RWC 40 and the head amplifier 30. When the write of the write data to the target sector by the head H is completed, the command processor 61 returns a write completion notification to the host system 2.

Upon receiving a read command including a logical address from the host system 2, the command processor 61 performs command processing on the read command. The command processor 61 converts the logical address included in the read command into a physical address. The command processor 61 obtains a target track and a target sector according to the logical address. The command processor 61 supplies command information including the target track and the target sector to the servo control unit 64. When the read data is read from the target sector by the head H, the command processor 61 returns the read data to the host system 2.

The command processor 61 includes a command queue control unit 611 and a reordering control unit 612.

The command queue control unit 611 generates a command queue on the volatile memory 70 or the buffer memory 80. The command queue control unit 611 enqueues a command received from the host system 2 into the command queue. The command queue control unit 611 dequeues the first command in the command queue.

The reordering control unit 612 performs reordering with a predetermined condition as a trigger. For example, the reordering control unit 612 rearranges commands in the command queue so that the commands are queued in order from a command with a closer physical address.

The servo control unit 64 includes a seek control unit 62 and a tracking control unit 63.

The seek control unit 62 acquires the command information including the target track and the target sector from the command processor 61. The seek control unit 62 performs seek control to move the head H to the target track according to the command information. For example, the seek control unit 64 acquires servo information from the head H via the head amplifier 30 and the RWC 40, and obtains the current position of the head H according to the servo information. The seek control unit 64 determines the trajectory of the head H to the target track, or the like according to the current position of the head H. The seek control unit 64 determines a current instruction value in accordance with the trajectory of the head H and supplies the current instruction value to the VCM control unit 202 via the MPU 50. The VCM control unit 202 supplies a current (or voltage) to the VCM 13 according to the current instruction value to drive the actuator. Thus, the head H is controlled to be positioned in the radial direction of the disk DK.

The seek control unit 62 can perform fastest seek control or just in time (JIT) seek control as the seek control.

The fastest seek control is control in a case where the rotation waiting time is absent. In the fastest seek control, the head H is controlled to move to the target sector of the target track as fast as possible. The fastest seek control can be implemented with the shortest time from the start of a seek until the head H reaches the target sector of the target track.

The JIT seek control is control in a case where a rotation waiting time is present. In the JIT seek control, the head H is controlled to move to the target sector of the target track using the rotation waiting time. In the JIT seek control, the rotation of the disk DK is waited until the head H reaches the target sector after reaching the target track from the start of the seek.

The seek control unit 62 includes a fastest seek control unit 621 and a JIT seek control unit 622.

The fastest seek control unit 621 performs the fastest seek control according to the command information. The fastest seek control unit 621 controls the input current to the VCM 13 and moves the head H from the current position to the position of the target sector of the target track at high speed.

For example, operation acceleration data may be stored in the nonvolatile memory 90 in advance. The operation acceleration data is time-series data of operation acceleration of the head H that can move at the fastest speed on the basis of the relationship between the movement distance and the movement time of the head H at the time of seek control. Upon receiving a command, the fastest seek control unit 621 determines the operation acceleration from the current position of the head H to the position of the target sector of the target track with reference to the operation acceleration data. The fastest seek control unit 621 determines a current instruction value according to the operation acceleration and supplies the current instruction value to the VCM 13. Thus, the fastest seek control unit 621 executes the fastest seek control.

Alternatively, a parameter may be stored in advance in the nonvolatile memory 90, and a mathematical expression of the operation acceleration may be set in the firmware. The mathematical expression of the operation acceleration may be an expression of a function indicating the operation acceleration of the head H that can move at the fastest speed on the basis of the relationship between the movement distance and the movement time of the head H at the time of seek control with respect to the parameter. Upon receiving a command, the fastest seek control unit 621 acquires the parameter and applies the parameter to the mathematical expression of the operation acceleration and calculates the operation acceleration of the head H. The fastest seek control unit 621 determines a current instruction value according to the operation acceleration and supplies the current instruction value to the VCM 13. Thus, the fastest seek control unit 621 executes the fastest seek control.

The seek control unit 62 may receive the command information, estimate the time until the head H is moved to the target track at the fastest seek, and determine whether waiting for rotation of the disk DK occurs according to the estimation result. When the rotation waiting occurs, the seek control unit 62 may determine to perform the JIT seek control by the JIT seek control unit 622.

The JIT seek control unit 622 performs the JIT seek control according to the command information. The JIT seek control unit 622 controls the input current to the VCM 13, and moves the head H from the current position to the position of the target sector of the target track using the rotation waiting time.

For example, operation acceleration data may be stored in the nonvolatile memory 90 in advance. The operation acceleration data is time-series data of the operation acceleration of the head H that can move using the rotation waiting time on the basis of the relationship between the movement distance and the movement time of the head H at the time of seek control. Upon receiving a command, the JIT seek control unit 622 refers to the operation acceleration data and determines the operation acceleration from the current position of the head H to the position of the target track so as to use the rotation waiting time. The JIT seek control unit 622 may determine the operation acceleration so that the time until the head H starts processing the target sector after arriving at the target track becomes larger than 0 and smaller than a certain threshold. The JIT seek control unit 622 determines a current instruction value according to the operation acceleration and supplies the current instruction value to the VCM 13. Thus, the JIT seek control unit 622 executes the JIT seek control.

Alternatively, a parameter may be stored in advance in the nonvolatile memory 90, and a mathematical expression of the operation acceleration may be set in the firmware. The mathematical expression of the operation acceleration may be an expression of a function indicating the operation acceleration of the head H that can move using the rotation waiting time on the basis of the relationship between the movement distance and the movement time of the head H at the time of seek control with respect to the parameter. Upon receiving a command, the JIT seek control unit 622 acquires the parameter and applies the parameter to the mathematical expression of the operation acceleration and calculates the operation acceleration of the head H. The JIT seek control unit 622 determines a current instruction value according to the operation acceleration and supplies the current instruction value to the VCM 13. Thus, the JIT seek control unit 622 executes the JIT seek control.

Alternatively, current instruction value data may be stored in the nonvolatile memory 90 in advance. The current instruction value data is time-series data of the current instruction value corresponding to the operation acceleration of the head H that can move using the rotation waiting time on the basis of the relationship between the operation acceleration of the head H at the time of seek control and the current instruction value. Upon receiving a command, the JIT seek control unit 622 refers to the current instruction value data, determines the current instruction value from the current position of the head H to the position of the target track so as to use the rotation waiting time, and supplies the current instruction value to the VCM 13. Thus, the JIT seek control unit 622 executes the JIT seek control.

Alternatively, a parameter may be stored in advance in the nonvolatile memory 90, and a mathematical expression of the current instruction value may be set in the firmware. The mathematical expression of the current instruction value may be an expression of a function indicating the current instruction value corresponding to the operation acceleration of the head H that can move using the rotation waiting time on the basis of the relationship between the movement distance and the movement time of the head H at the time of seek control with respect to the parameter. Upon receiving a command, the JIT seek control unit 622 acquires the parameter, applies the parameter to the mathematical expression of the current instruction value, calculates the current instruction value of the head H, and supplies the current instruction value to the VCM 13. Thus, the JIT seek control unit 622 executes the JIT seek control.

The tracking control unit 63 controls the microactuator MA to track the head H on the target track.

The volatile memory 70 is used by the controller 3 to temporarily store data and the like. The volatile memory 70 is, for example, a dynamic RAM (DRAM) or a static RAM (SRAM).

The buffer memory 80 includes a write buffer and a read buffer. The write buffer temporarily stores data to be written to the disk DK by a command (for example, the write command) instructing writing of write data to the disk DK. The read buffer temporarily stores data read from the disk DK by a command (for example, the read command) instructing reading of read data from the disk DK.

The nonvolatile memory 90 stores data in a nonvolatile manner. The nonvolatile memory 90 is, for example, a flash memory. The nonvolatile memory 90 may store the operation acceleration data, the current instruction value data, and parameters.

Figure 2:
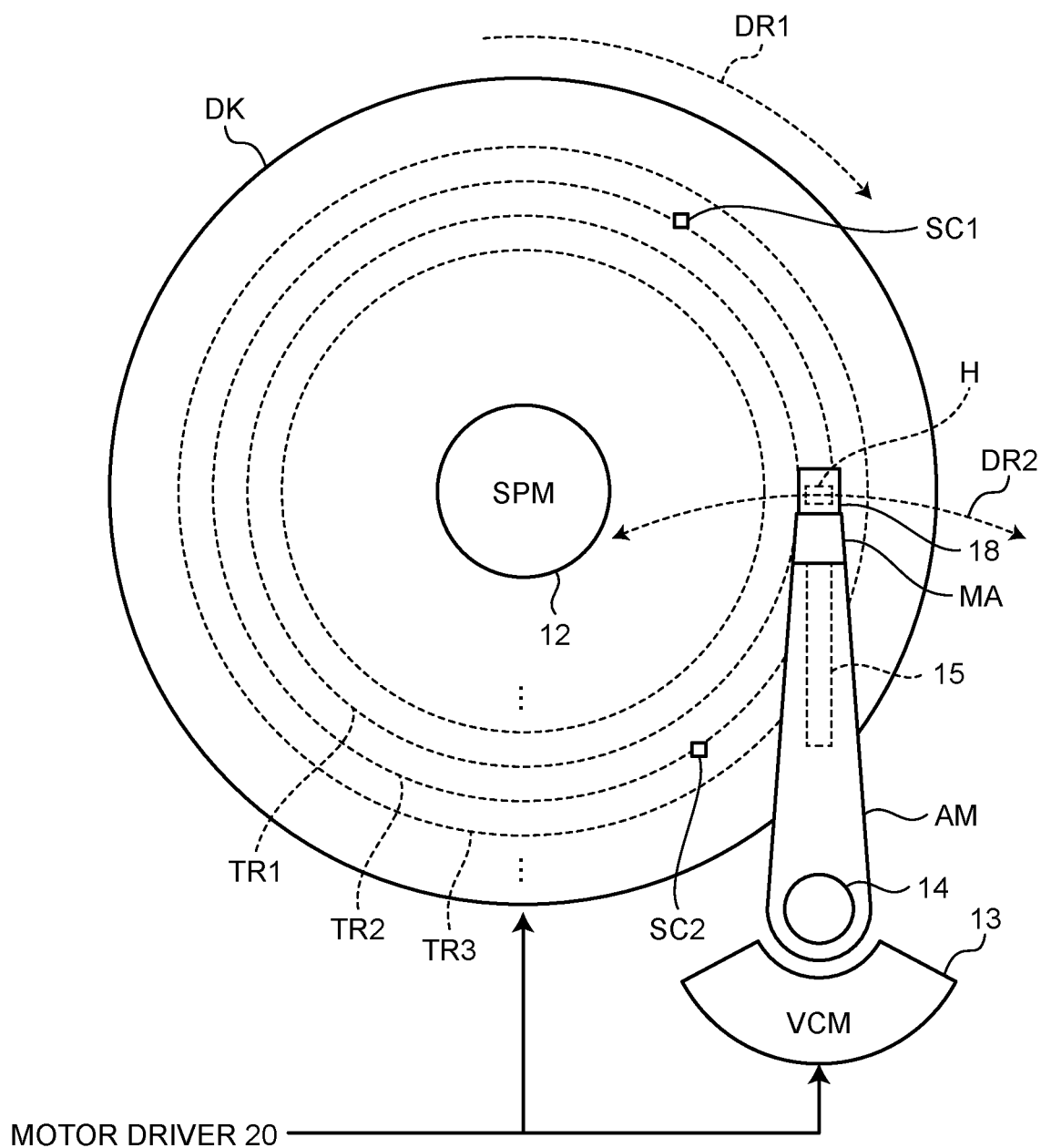
FIG. 2 is a diagram illustrating a seek operation in the embodiment.

In the disk device 1, the seek operation is performed as illustrated in FIG. 2. FIG. 2 is a diagram illustrating a seek operation.

The SPM 12 is driven by the motor driver 20 to rotate the disk DK in a circumferential direction DR1. The VCM 13 is driven by the motor driver 20 to rotate the arm AM around the bearing 14 and move the head H supported at the distal end of the arm AM in a radial direction DR2. Thus, the seek operation is implemented.

In the disk DK, a plurality of tracks TR (for example, tracks TR1 to TR3) is concentrically defined. Each track TR includes a plurality of data sectors. Data may be written to each data sector. FIG. 2 illustrates a plurality of data sectors SC1 and SC2 included in the track TR2.

The seek control unit 64 may determine whether to perform the JIT seek control or the fastest seek control on the basis of the relationship between the target sector of the disk DK and the current position of the head H.

For example, in a case where the target track is the track TR2, the target sector is the data sector SC2, and the current position of the head H is the circumferential position between the data sectors SC1 and SC2 in the track TR1, occurrence of the rotation waiting time is predicted when the head H moves from the current track TR1 to the target track TR2. Thus, the seek control unit 64 may determine to perform the JIT seek control for adjusting the seek end time within a waiting time for rotation before the target sector.

Figure 3:
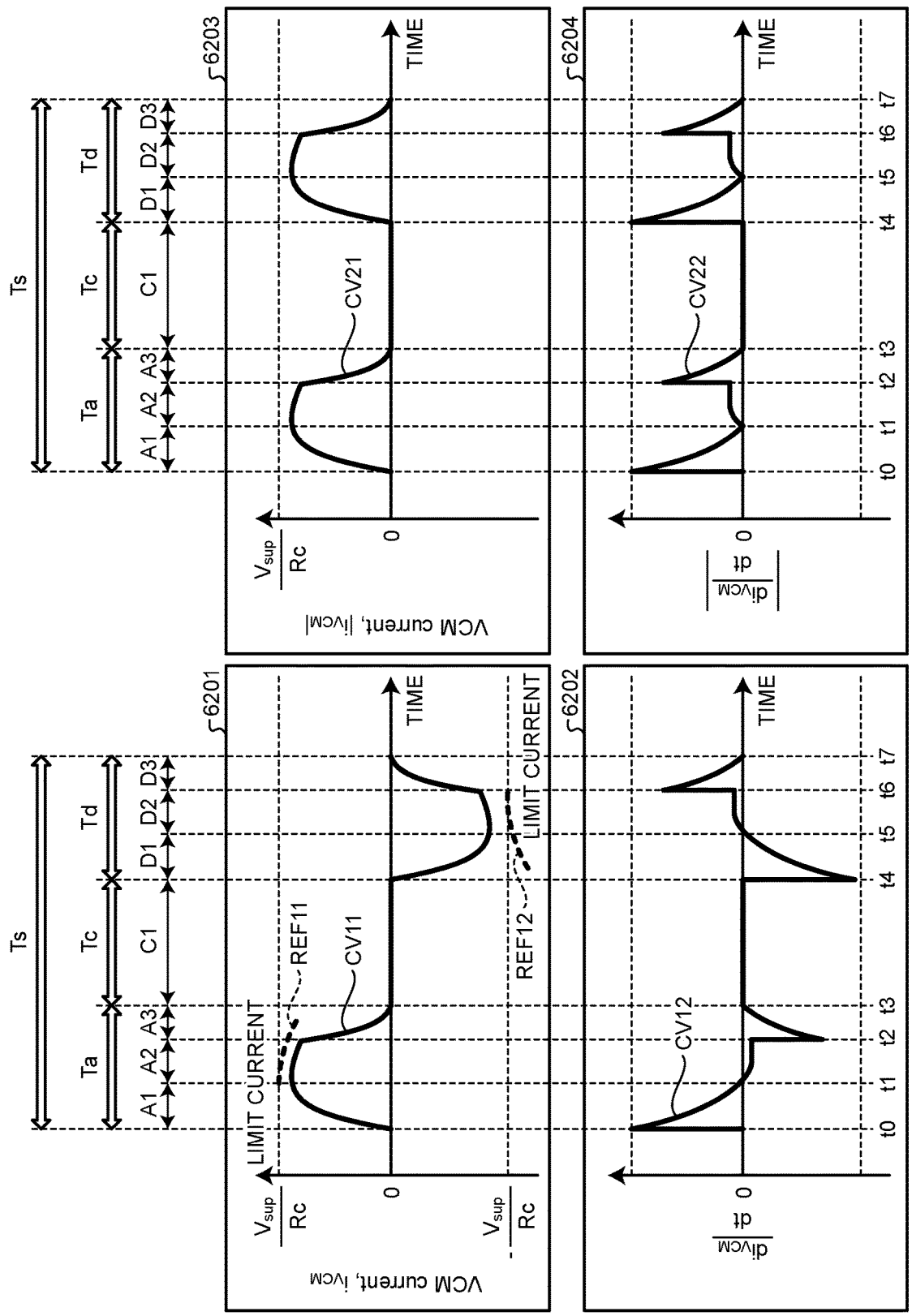
FIG. 3 is a diagram illustrating a seek period and a definition of each section in the embodiment.

Here, a period during which the seek operation is performed is referred to as a seek period, and each section in the seek period is defined as illustrated in FIG. 3 in association with a current waveform of the VCM 13. FIG. 3 is a diagram illustrating a seek period and a definition of each section thereof.

A chart 6201 illustrates a waveform of a current $i_{VCM}$ of the VCM 13. A chart 6202 illustrates a waveform of a differential $di_{VCM}/dt$ of the current of the VCM 13. As for the direction of the current $i_{VCM}$, a direction in which the head H is accelerated in the seek operation is defined as positive, and a direction in which the head H is decelerated is defined as negative. A chart 6203 illustrates a waveform of an absolute value $|i_{VCM}|$ of the current of the VCM 13. A chart 6204 illustrates a waveform of an absolute value $|di_{VCM}/dt|$ of the differential of the current of the VCM 13.

In each chart 6201 to 6204, the horizontal axis represents time. In the chart 6201, the vertical axis represents the magnitude of the current $i_{VCM}$ of the VCM 13. In the chart 6202, the vertical axis represents the magnitude of the differential $di_{VCM}/dt$ of the current of the VCM 13. In the chart 6203, the vertical axis represents the magnitude of the absolute value $|i_{VCM}|$ of the current of the VCM 13. In the chart 6204, the vertical axis represents the magnitude of the absolute value $|di_{VCM}/dt|$ of the differential of the current of the VCM 13.

In the chart 6201, REF11 and REF12 indicate limit currents. A characteristic CV11 is a time-series characteristic of the current $i_{VCM}$ of the VCM 13 in the seek period of the JIT seek control. The characteristic CV11 falls within the range defined by the limit currents REF11 and REF12.

In the chart 6202, a characteristic CV12 is a time-series characteristic of a differential value with respect to the characteristic CV11. In the chart 6203, a characteristic CV21 is a time-series characteristic of the absolute value $|i_{VCM}|$ of the current of the VCM 13 in the seek period of the JIT seek control. In the chart 6204, a characteristic CV22 is a time-series characteristic of the differential value $|di_{VCM}/dt|$ with respect to the characteristic CV11.

A seek period Ts is a period from the start to the end of the seek operation. The seek period Ts includes an acceleration section Ta, a constant velocity section Tc, and a deceleration section Td.

In the acceleration section Ta, the controller 3 supplies a positive current $i_{VCM}$ to the VCM 13 to accelerate the moving speed of the head H in the radial direction. In the constant velocity section Tc, the controller 3 supplies the substantially zero current $i_{VCM}$ to the VCM 13 to maintain the moving speed of the head H in the radial direction substantially constant. In the deceleration section Td, the controller 3 supplies the negative current $i_{VCM}$ to the VCM 13 to decelerate the moving speed of the head H in the radial direction.

The acceleration section Ta includes a rising section A1, a flat section A2, and a falling section A3. In the rising section A1, the controller 3 raises the waveform of the current $i_{VCM}$ of the VCM 13 on the positive side. In the flat section A2, the controller 3 changes the waveform of the current $i_{VCM}$ of the VCM 13 to be substantially flat along a limit current REF11. In the falling section A3, the controller 3 causes the waveform of the current $i_{VCM}$ of the VCM 13 to fall from the positive side.

The constant velocity section Tc includes a flat section C1. In the flat section C1, the controller 3 changes the waveform of the current $i_{VCM}$ of the VCM 13 to be flat.

The deceleration section Td includes a rising section D1, a flat section D2, and a falling section D3. In the rising section D1, the controller 3 raises the waveform of the current $i_{VCM}$ of the VCM 13 on the negative side. In the flat section D2, the controller 3 changes the waveform of the current $i_{VCM}$ of the VCM 13 to be substantially flat along the limit current REF12. In the falling section D3, the controller 3 causes the waveform of the current $i_{VCM}$ of the VCM 13 to fall from the negative side.

Figure 4:
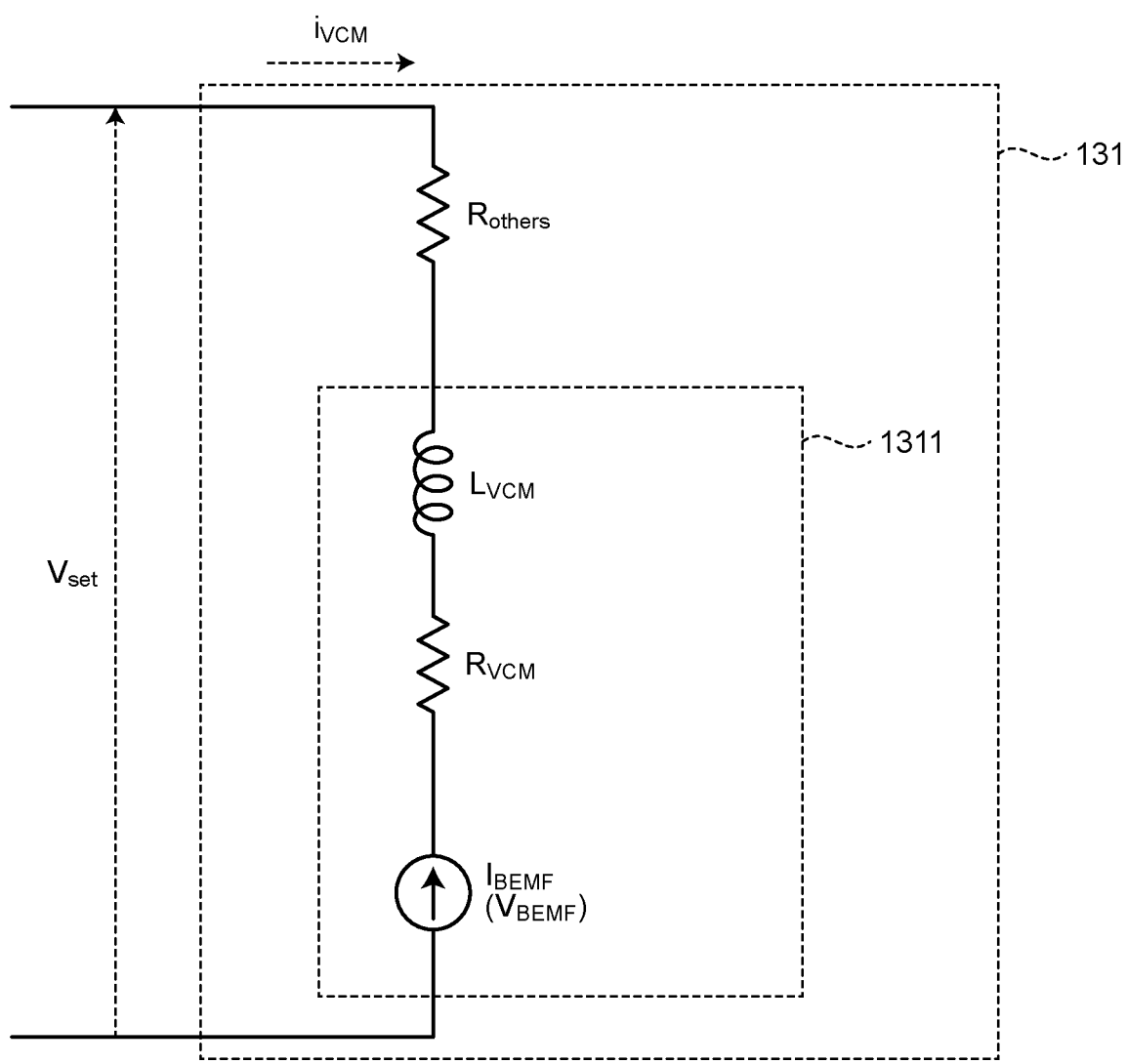
FIG. 4 is a diagram illustrating an equivalent circuit of a VCM in the embodiment.

The limit currents REF11 and REF12 are currents as electrical limits determined from the circuit characteristics of the VCM 13 on the basis of the VCM 13 having an equivalent circuit as illustrated in FIG. 4. FIG. 4 is a diagram illustrating an equivalent circuit of the VCM 13.

A set voltage $V_{set}$ is applied to the VCM 13 from the motor driver 20, and the current $i_{VCM}$ is input from the motor driver 20. A circuit 131 is an equivalent circuit viewed from the set voltage $V_{set}$. The circuit 131 includes a series connection of a resistance $R_{others}$ and a circuit 1311. The circuit 1311 corresponds to a coil portion in the VCM 13. The resistance $R_{others}$ corresponds to wiring connected to the coil portion of the VCM 13.

The circuit 1311 corresponds to an equivalent circuit viewed from the supply voltage to the VCM 13. The circuit 1311 includes a series connection of an inductance $L_{VCM}$, a resistance $R_{VCM}$, and a current source $I_{BEMF}$. The inductance $L_{VCM}$ corresponds to an inductance component of the coil portion in the VCM 13. The resistance $R_{VCM}$ corresponds to a resistance component of the coil portion in the VCM 13. The current source $I_{BEMF}$ corresponds to a counter electromotive voltage $V_{BEMF}$ of the coil portion in the VCM 13, and allows a current corresponding to the counter electromotive voltage $V_{BEMF}$ to flow.

Since the VCM 13 has the equivalent circuit illustrated in FIG. 4, the current $i_{VCM}$ of the VCM 13 in the rising section A1 and the flat section A2 illustrated in FIG. 3 can be expressed by the following Expression 1.

$$V_{set} = R_C i_{VCM} + L_{VCM} \frac{di_{VCM}}{dt} + V_{BEMF} \qquad \text{Expression 1}$$

In Expression 1, $R_C$ is a combined resistance of the circuit 131. $L_{VCM}$ is the inductance of the circuit 1311. $V_{set}$ is a set voltage. $V_{BEMF}$ is a counter electromotive voltage and can be expressed by the following Expression 2.

$$V_{BEMF} = K_f v \qquad \text{Expression 2}$$

In Expression 2, v is a moving speed of the head H in the radial direction. $K_f$ is a current force constant. The relationship between the current $i_{VCM}$ of the VCM 13 and an acceleration a of the head H can be expressed by the following Expression 3.

$$a = \frac{K_f}{m} i_{VCM} \qquad \text{Expression 3}$$

In Expression 3, m is an equivalent mass of the head H.

In the adjustment of the current level in the acceleration section Ta, by changing the set voltage $V_{set}$ and adjusting the time in the constant velocity section Tc in Expression 1, seek control for a long time can be performed with respect to the reference seek (for example, the fastest seek).

In the chart 6201 illustrated in FIG. 3, the current $i_{VCM}$ of the VCM 13 is generated in accordance with Expression 1 from time t0 to time t2 (rising section A1 and flat section A2). From time t2 to time t3 (falling section A3), the current $i_{VCM}$ of the VCM 13 is controlled to discharge in accordance with a time constant of the circuit 131, and approaches 0. From time t3 to time t4 (flat section C1), the current $i_{VCM}$ of the VCM 13 is maintained at substantially 0. From time t4 to time t6 (rising section D1 and flat section D2), the current $i_{VCM}$ of the VCM 13 is generated according to the mathematical expression corresponding to the opposite polarity of Expression 1. From time t6 to time t7 (falling section D3), the current $i_{VCM}$ of the VCM 13 is controlled to discharge in accordance with the time constant of the circuit 131, and approaches 0.

The flat section A2 is also defined as follows. The acceleration section Ta is a section starting at time t1 when the absolute value $|i_{VCM}|$ of the current of the VCM 13 is maximized in the acceleration section Ta and ending at time t2 when the absolute value $|di_{VCM}/dt|$ of the differential of the current of the VCM 13 is maximized before time t4 when the polarity of the current $i_{VCM}$ of the VCM 13 is inverted.

The flat section D2 is also defined as follows. The deceleration section Td is a section starting at time t5 when the absolute value $|i_{VCM}|$ of the current of the VCM 13 is maximized and ending at time t6 when the absolute value $|di_{VCM}/dt|$ of the differential of the current of the VCM 13 is maximized before time t7 when the current $i_{VCM}$ of the VCM 13 is 0.

Note that the supply voltage $V_{sup}$ supplied to the VCM 13 can be expressed by the following Expression 4.

$$V_{sup} = R_C i_{VCM} + L_{VCM} \frac{di_{VCM}}{dt} \qquad \text{Expression 4}$$

As indicated in Expressions 1 and 4, the supply voltage $V_{sup}$ attenuates by the counter electromotive voltage $V_{BEMF}$ with respect to the set voltage $V_{set}$. Accordingly, the current $i_{VCM}$ of the VCM 13 is limited to a limit current or less corresponding to the counter electromotive voltage $V_{BEMF}$.

The limit currents REF11 and REF12 illustrated in FIG. 3 are electrical limits determined from the characteristics of the equivalent circuit (see FIG. 4) of the VCM 13.

Figure 5:
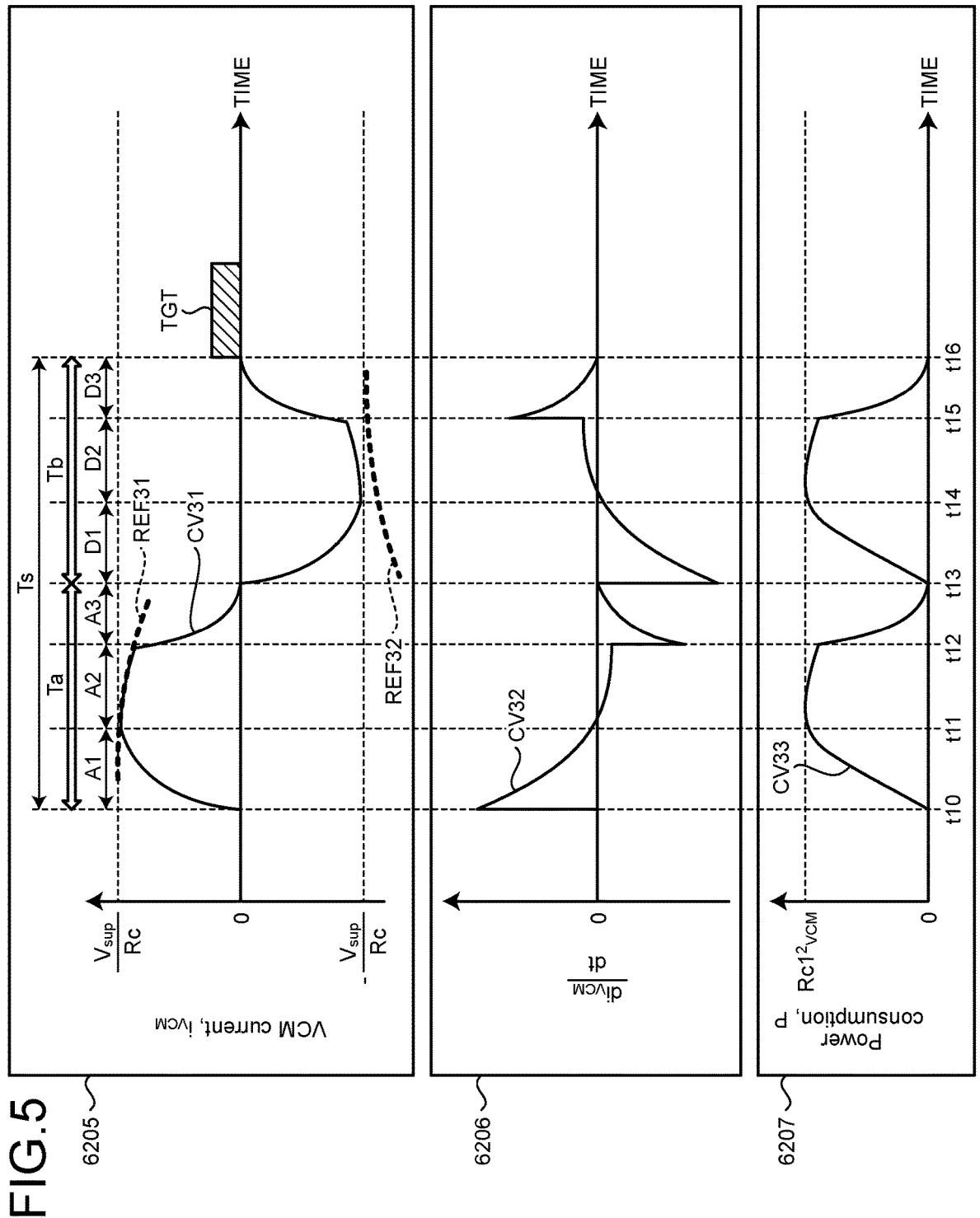
FIG. 5 is a diagram illustrating a VCM current waveform when a rotation waiting time is absent in the embodiment.

For example, when the rotation waiting time is absent, the fastest seek control is performed, and the current waveform of the VCM 13 at that time is as illustrated in FIG. 5. FIG. 5 is a diagram illustrating a VCM current waveform when the rotation waiting time is absent.

A chart 6205 illustrates a waveform CV31 of the current $i_{VCM}$ of the VCM 13. A chart 6206 illustrates a waveform CV32 of the differential $di_{VCM}/dt$ of the current of the VCM 13. A chart 6207 illustrates a waveform CV33 of power consumption P of the VCM 13.

In each chart 6205 to 6207, the horizontal axis represents time. In the chart 6205, the vertical axis represents the magnitude of the current $i_{VCM}$ of the VCM 13. In the chart 6206, the vertical axis represents the magnitude of the differential $di_{VCM}/dt$ of the current of the VCM 13. In the chart 6207, the vertical axis represents the magnitude of the power consumption P of the VCM 13.

In the fastest seek control, as illustrated in FIG. 5, times t10 to t16 is the seek period Ts, and a process TGT for the target sector becomes possible from time t16 at which the seek period Ts ends. In this case, the rotation waiting time is absent.

In the fastest seek control, the constant velocity section Tc may be omitted. Time t10 to t13 is the acceleration section Ta, and time t13 to t16 is the deceleration section Td.

As indicated by the waveform CV31, in the acceleration section Ta, saturated acceleration control is performed, and the maximum current $i_{VCM}$ that can be input may be input to the VCM 13, but falls within a limit current REF31 or less. In the deceleration section Td, in order to suppress settling of the head H, the current $i_{VCM}$ is not set to the maximum current that can be input, and the current $i_{VCM}$ suppressed to some extent is input to the VCM 13.

In the acceleration section Ta, time t10 to t11 is the rising section A1, time t11 to t12 is the flat section A2, and time t12 to t13 is the falling section A3.

In the rising section A1, the controller 3 raises the waveform of the current $i_{VCM}$ of the VCM 13 on the positive side. The controller 3 may change the current $i_{VCM}$ of the VCM 13 according to Expression 1.

In the flat section A2, the controller 3 changes the current $i_{VCM}$ of the VCM 13 along the limit current REF31. The controller 3 changes the current $i_{VCM}$ of the VCM 13 at an average change rate AR1. The average change rate AR1 can be obtained by averaging the differential $di_{VCM}/dt$ over the time of the flat section A2. The average change rate AR1 is a value indicating a change along the limit current REF31 and can be a negative value. The controller 3 may estimate in advance the limit current REF31 in consideration of the counter electromotive voltage $V_{BEMF}$. In the flat section A2, the controller 3 may replace the current instruction value with an estimated value of the limit current REF31.

In the falling section A3, the controller 3 causes the waveform of the current $i_{VCM}$ of the VCM 13 to fall from the positive side to zero at an average change rate AR2. The average change rate AR2 can be obtained by averaging the differential $di_{VCM}/dt$ over the time of the falling section A3. The average change rate AR2 is a value indicating a steeper change than the average change rate AR1, and is a negative value.

In the deceleration section Td, time t13 to t14 is the rising section D1, time t14 to t15 is the flat section D2, and time t15 to t16 is the falling section D3.

In the rising section D1, the controller 3 raises the waveform of the current $i_{VCM}$ of the VCM 13 on the negative side. The controller 3 may change the current $i_{VCM}$ of the VCM 13 according to a mathematical expression in which the polarity of Expression 1 is inverted.

In the flat section D2, the controller 3 changes the current $i_{VCM}$ of the VCM 13 along a limit current REF32. The controller 3 changes the current $i_{VCM}$ of the VCM 13 at the average change rate DR1. The average change rate DR1 can be obtained by averaging the differential $di_{VCM}/dt$ over the time of the flat section D2. The average change rate DR1 is a value indicating a change along the limit current REF32, and can be a positive value. The controller 3 may estimate in advance the limit current REF32 in consideration of the counter electromotive voltage $V_{BEMF}$. In the flat section D2, the controller 3 may replace the current instruction value with a value obtained by adding a predetermined value to an estimated value of the limit current REF32.

In the falling section D3, the controller 3 causes the waveform of the current $i_{VCM}$ of the VCM 13 to fall from the negative side to zero at an average change rate DR2. The average change rate DR2 can be obtained by averaging the differential $di_{VCM}/dt$ over the time of the falling section D3. The average change rate DR2 is a value indicating a steeper change than the average change rate DR1, and is a positive value.

As indicated by the waveform CV33, in the acceleration section Ta, the power consumption P increases as the absolute value of the current $i_{VCM}$ increases, the power consumption P reaches $Rci_{VCM}^2$ near time t11 when the current $i_{VCM}$ reaches the limit current REF31, and then the power consumption decreases as the absolute value of the current $i_{VCM}$ decreases. In the deceleration section Td, the power consumption increases as the absolute value of the current $i_{VCM}$ increases, the power consumption P reaches $Rci_{VCM}^2$ near time t14 when the current $i_{VCM}$ reaches the limit current REF32, and then the power consumption decreases as the absolute value of the current $i_{VCM}$ decreases.

Figure 6:
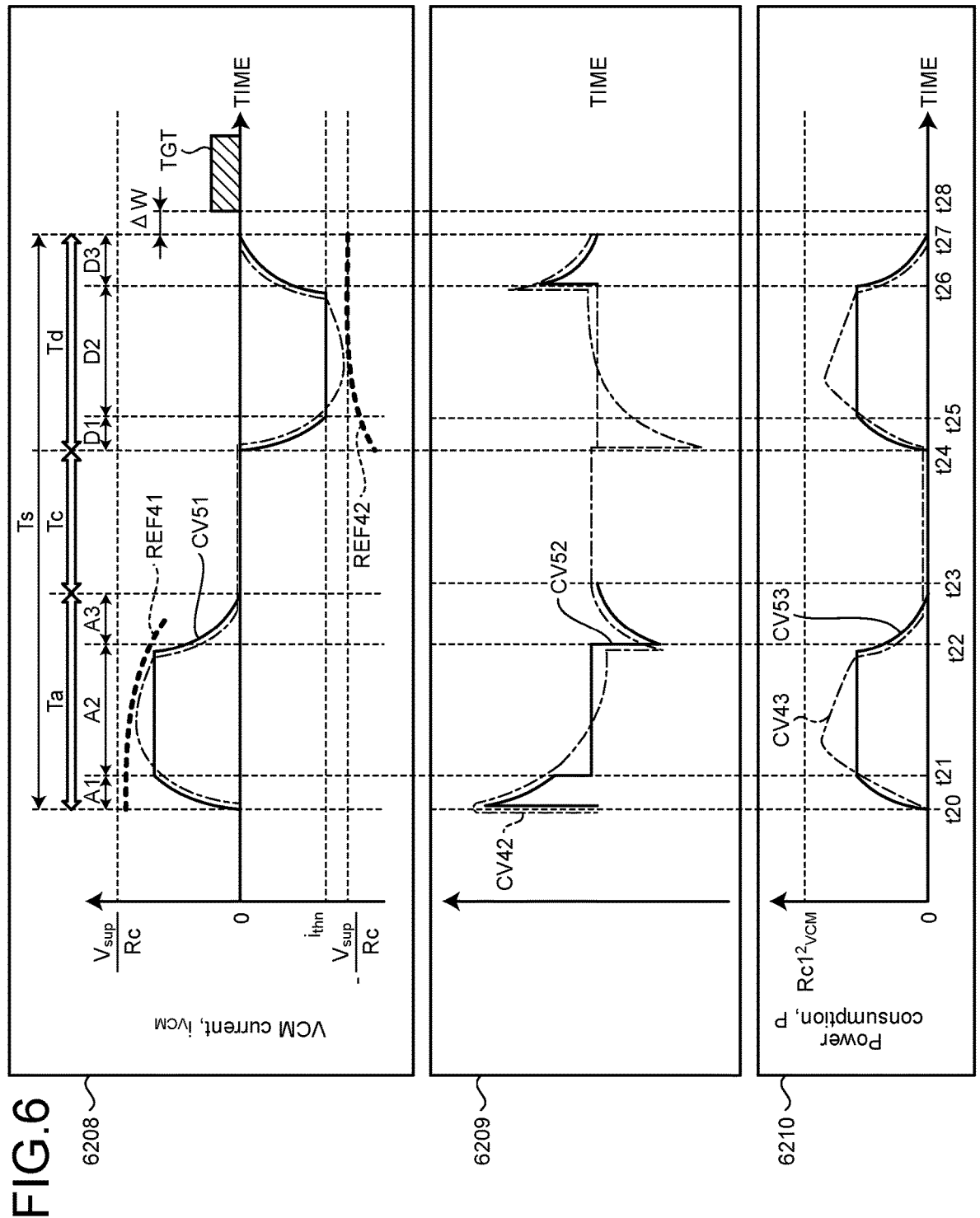
FIG. 6 is a diagram illustrating a VCM current waveform when the rotation waiting time is present in the embodiment.

When a rotation waiting time ΔW is present, the first JIT seek control can be performed, but the current waveform of the VCM 13 in the first JIT seek control is as indicated by a one-dot chain line in FIG. 6. FIG. 6 is a diagram illustrating a VCM current waveform when the rotation waiting time ΔW is present.

The first JIT seek control is control in which the constant velocity section Tc is added to the fastest seek control (see FIG. 5).

In the first JIT seek control, a chart 6208 illustrates a waveform CV41 of the current $i_{VCM}$ of the VCM 13. A chart 6209 illustrates a waveform CV42 of the differential $di_{VCM}/dt$ of the current of the VCM 13. A chart 6210 illustrates a waveform CV43 of the power consumption P of the VCM 13.

In each chart 6208 to 6210, the horizontal axis represents time. In the chart 6208, the vertical axis represents the magnitude of the current $i_{VCM}$ of the VCM 13. In the chart 6209, the vertical axis represents the magnitude of the differential $di_{VCM}/dt$ of the current of the VCM 13. In the chart 6210, the vertical axis represents the magnitude of the power consumption P of the VCM 13.

In the first JIT seek control, as illustrated in FIG. 6, time t20 to time t27 is the seek period Ts, and the rotation waiting time ΔW is present from time t27 to time t28 at which the seek period Ts ends. From time t28, the process TGT for the target sector becomes possible.

As indicated by the waveform CV41, the saturated acceleration control is suppressed in the acceleration section Ta of the head H from the start of the seek control, and the current $i_{VCM}$ slightly smaller than the maximum current that can be input may be input to the VCM 13, but falls within a limit current REF41 or less. In the deceleration section Td, the current $i_{VCM}$ further suppressed from the maximum current that can be input by the current $i_{VCM}$ is input to the VCM 13.

In the acceleration section Ta, in the flat section A2, the controller 3 changes the current $i_{VCM}$ of the VCM 13 along the limit current REF41. The controller 3 changes the current $i_{VCM}$ of the VCM 13 at an average change rate AR11. The average change rate AR11 can be obtained by averaging the differential $di_{VCM}/dt$ over the time of the flat section A2. The average change rate AR11 is a value indicating a change substantially along the limit current REF41, and may be a negative value.

In the deceleration section Td, in the flat section D2, the controller 3 changes the current $i_{VCM}$ of the VCM 13 along a limit current REF42. The controller 3 changes the current $i_{VCM}$ of the VCM 13 at an average change rate DR11. The average change rate DR11 can be obtained by averaging the differential $di_{VCM}/dt$ over the time of the flat section D2. The average change rate DR11 is a value indicating a change substantially along the limit current REF42, and may be a positive value.

As indicated by the waveform CV43, in the acceleration section Ta, the power consumption P increases as the absolute value of the current $i_{VCM}$ increases, the power consumption P reaches a value slightly lower than $Rci_{VCM}^2$ immediately after time t21 when the current $i_{VCM}$ reaches a peak, and then the power consumption P decreases as the absolute value of the current $i_{VCM}$ decreases. In the deceleration section Td, the power consumption P increases as the absolute value of the current $i_{VCM}$ increases, the power consumption P reaches a value slightly lower than $Rci_{VCM}^2$ immediately after time t14 when the current $i_{VCM}$ reaches a peak, and then the power consumption P decreases as the absolute value of the current $i_{VCM}$ decreases.

In the first JIT seek control, time t27 to end is determined according to the rotation waiting time ΔW, and the length of the constant velocity section Tc is adjusted accordingly. In the first JIT seek control, there is time to spare in the control, and there is room for further suppressing the saturated acceleration control.

Thus, when the rotation waiting time ΔW is present, the second JIT seek control can be performed. In the second JIT seek control, control in which the absolute value of the current $i_{VCM}$ of the VCM 13 is further suppressed is performed with respect to the first JIT seek control. The second JIT seek control achieves lower power consumption than the first JIT seek control.

The current waveform of the VCM 13 in the second JIT seek control is as indicated by a solid line in FIG. 6.

In the second JIT seek control, the chart 6208 illustrates a waveform CV51 of the current $i_{VCM}$ of the VCM 13. The chart 6209 illustrates a waveform CV52 of the differential $di_{VCM}/dt$ of the current of the VCM 13. The chart 6210 illustrates a waveform CV53 of the power consumption P of the VCM 13.

As indicated by the waveform CV51, in the acceleration section Ta of the head H from the start of the seek control, the current $i_{VCM}$ that changes flatly on the substantially positive side can be input to the VCM 13. In the deceleration section Td, the current $i_{VCM}$ that changes flatly on the substantially negative side can be input to the VCM 13.

In the acceleration section Ta, in the flat section A2, the controller 3 changes the current $i_{VCM}$ of the VCM 13 to be flat. The controller 3 changes the current $i_{VCM}$ of the VCM 13 at an average change rate AR21. The average change rate AR21 can be obtained by averaging the differential $di_{VCM}/dt$ over the time of the flat section A2. The average change rate AR21 is a value close to zero, and may be substantially zero. The controller 3 may maintain the current $i_{VCM}$ of the VCM 13 near a current threshold $i_{thp}$. The current threshold $i_{thp}$ may be a value that is reached at time t21 when the current $i_{VCM}$ is changed according to Expression 1 from time 20.

In the deceleration section Td, in the flat section D2, the controller 3 changes the current $i_{VCM}$ of the VCM 13 to be flat. The controller 3 changes the current $i_{VCM}$ of the VCM 13 at the average change rate DR11. An average change rate DR21 can be obtained by averaging the differential $di_{VCM}/dt$ over the time of the flat section D2. The average change rate DR21 is a value close to zero, and may be substantially zero. The controller 3 may maintain the current $i_{VCM}$ of the VCM 13 near the current threshold $i_{thn}$. The current threshold $i_{thn}$ may be a value that is reached at time t25 when the current $i_{VCM}$ is changed from time 24 according to a mathematical expression in which the polarity of Expression 1 is inverted.

As indicated by the waveform CV53, in the acceleration section Ta, the power consumption P increases as the absolute value of the current $i_{VCM}$ increases, the power consumption P changes to be flat in the flat section A2 in which the current $i_{VCM}$ changes to be flat, and then the power consumption P decreases as the absolute value of the current $i_{VCM}$ decreases. In the deceleration section Td, the power consumption P increases as the absolute value of the current $i_{VCM}$ increases, the power consumption P changes flat in the flat section D2 in which the current $i_{VCM}$ changes flat, and then the power consumption P decreases as the absolute value of the current $i_{VCM}$ decreases.

Comparing the fastest seek with the second JIT seek control, the magnitude of the differential $d|i_{VCM}|/dt$ of the absolute value of the current in the flat sections A2 and D2 is different.

As compared with the magnitude of the differential $d|i_{VCM}|/dt$ of the absolute value of the current in the flat sections A2 and D2 illustrated in the waveform CV32 illustrated in FIG. 5, the magnitude of the differential $d|i_{VCM}|/dt$ of the absolute value of the current in the flat sections A2 and D2 illustrated in the waveform CV52 illustrated in FIG. 6 is closer to zero.

When the current of the VCM 13 in the fastest seek performed when the rotation waiting time is absent is $i_{VCM\_NoRotWait}$ and the current of the VCM 13 in the second JIT seek control performed when the rotation waiting time is present is $i_{VCM\_RotWait}$, the following Expression 5 is established.

$$ave\left(\frac{d|i_{VCM\_NoRotWait}|}{dt}\right) < ave\left(\frac{d|i_{VCM\_RotWait}|}{dt}\right) \quad \text{Expression 5}$$

In Expression 5, the left side indicates a value obtained by averaging the current $i_{VCM\_NoRotWait}$ by the time of the flat sections A2 and D2. The left side is a negative value or zero. The right side indicates a value obtained by averaging the current $i_{VCM\_RotWait}$ by the time of the flat sections A2 and D2. The right side is a negative value or zero.

Here, the power consumption P of the circuit 131 illustrated in FIG. 4 can be expressed by the following Expression 6.

$$P = R_C i_{VCM}^2 \quad \text{Expression 6}$$

In Expression 6, $R_C$ is a combined resistance of the circuit 131. As indicated in Expression 6, the current $i_{VCM}$ of the VCM 13 has a square effect on the power consumption P. Thus, as indicated by the waveform CV51, by bringing the average change rate of the current $i_{VCM}$ in the flat sections A2 and D2 closer to zero than the waveform CV31 (see FIG. 5) and flattening (for example, making it constant) the change to suppress the absolute value of the current $i_{VCM}$, low power consumption can be achieved.

In FIGS. 5 and 6, it is assumed that the times in the corresponding sections A1, A2, A3, D1, D2, and D3 are equal. Comparing the waveform CV33 illustrated in FIG. 5 with the waveform CV53 illustrated in FIG. 6, in the flat section A2, the integrated value of the power consumption P of the waveform CV53 is lower than the integrated value of the power consumption P of the waveform CV33. In the flat section D2, the integrated value of the power consumption P of the waveform CV53 is lower than the integrated value of the power consumption P of the waveform CV33.

That is, in the second JIT seek control, the power consumption is reduced as compared with the fastest seek control.

For example, a power consumption reduction of 2.5% is expected in a distance seek of 15% of a data area width on the disk DK.

In addition, as compared with the magnitude of the differential $d|i_{VCM}|/dt$ of the absolute value of the current in the flat sections A2 and D2 illustrated in the waveform CV42 illustrated in FIG. 6, the magnitude of the differential $d|i_{VCM}|/dt$ of the absolute value of the current in the flat sections A2 and D2 illustrated in the waveform CV52 is closer to zero.

As indicated in Expression 6, the current $i_{VCM}$ of the VCM 13 has a square effect on the power consumption P. Thus, as indicated by the waveform CV51, by bringing the average change rate of the current $i_{VCM}$ in the flat sections A2 and D2 closer to zero than the waveform CV41 and flattening (for example, it is made constant) the change to suppress the absolute value of the current $i_{VCM}$, low power consumption can be achieved.

Comparing the waveform CV43 and the waveform CV53 illustrated in FIG. 6, in the flat section A2, the integrated value of the power consumption P of the waveform CV53 is lower than the integrated value of the power consumption P of the waveform CV43. In the flat section D2, the integrated value of the power consumption P of the waveform CV53 is lower than the integrated value of the power consumption P of the waveform CV43.

That is, in the second JIT seek control, the power consumption is reduced as compared with the first JIT seek control.

In the second JIT seek control, a function of bringing the average change rate of the current $i_{VCM}$ in the flat sections A2 and D2 close to zero and flattening (for example, it is made constant) the change is added to the first JIT seek control. This function is referred to as an AFC (AccFlat Const) function.

As described above, the limit currents REF41 and REF42 are electrical limits determined from the characteristics of the equivalent circuit (see FIG. 4) of the VCM 13. Thus, when the average change rate of the current $i_{VCM}$ in the flat sections A2 and D2 is brought close to zero and the change is flattened (for example, it is made constant), the current $i_{VCM}$ may exceed the limit currents REF41 and REF42. In this case, even if the AFC function is enabled, the current exceeding the limit currents REF41 and REF42 cannot electrically flow in the VCM 13 with respect to the instruction value of the current $i_{VCM}$, and the control of the controller 3 may fail. It is difficult for the controller 3 to enable the AFC function without causing the control to fail.

Thus, in a case where the rotation waiting time ΔW is present, the third JIT seek control can be performed. In the third JIT seek control, with respect to the second JIT seek control, the instruction value of the current $i_{VCM}$ in the flat section A2 and/or the flat section D2 is adjusted to fall within the limit currents REF41 and REF42 while being flattened (for example, it is made constant). In the third JIT seek control, the flat section A2 and/or the flat section D2 is divided into a first flat section in which the limit currents REF41 and REF42 are not exceed and a second flat section in which them are exceeded when the AFC function is enabled, and the instruction value of the current $i_{VCM}$ is changed so as to follow the limit currents REF41 and REF42 in the second flat section. Thus, in the third JIT seek control, the AFC function can be enabled within the limit currents REF41 and REF42, and low power consumption can be achieved while maintaining access performance.

Figure 7:
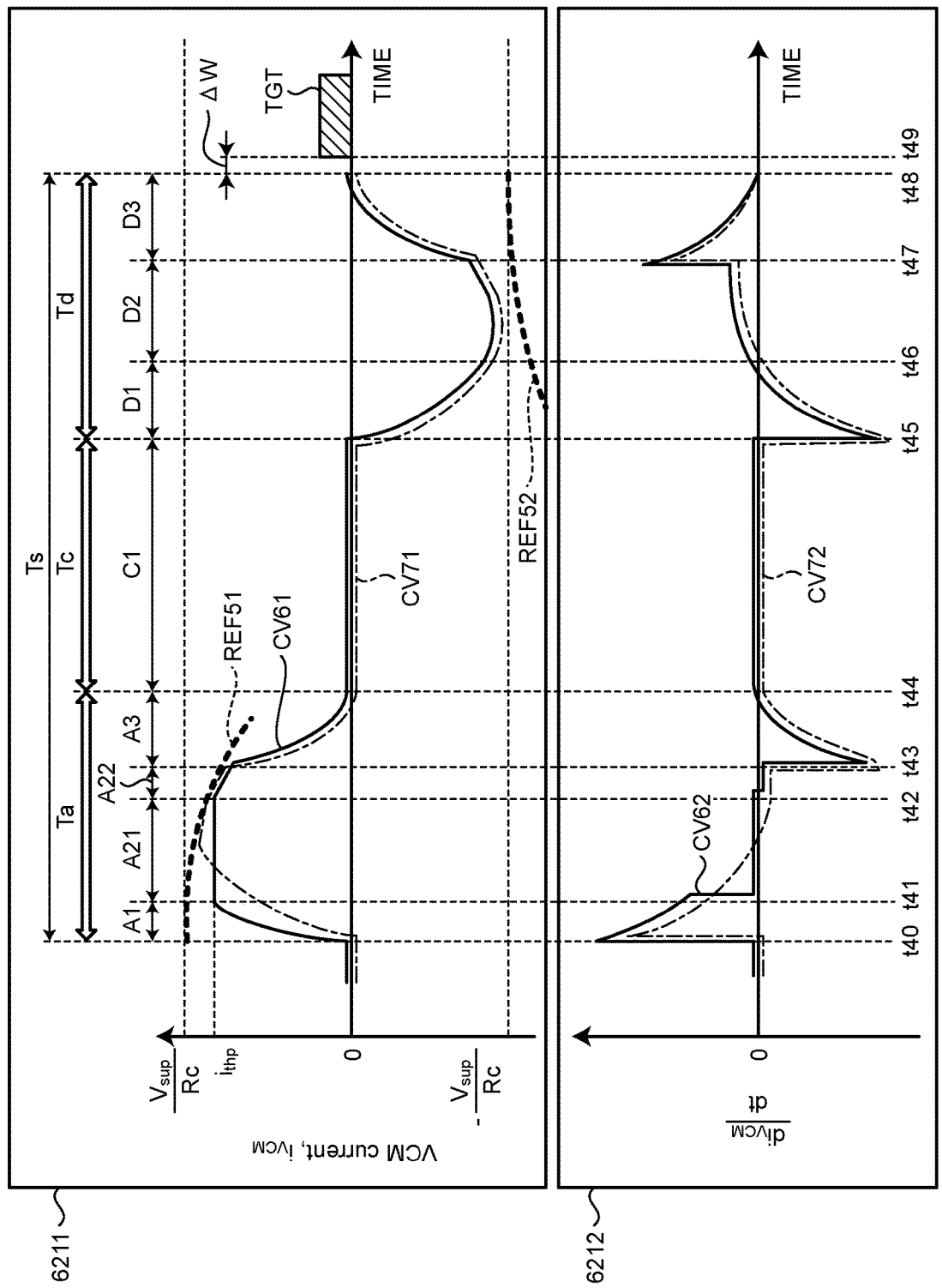
FIG. 7 is a diagram illustrating a VCM current waveform when the rotation waiting time is present in the embodiment.

The current waveform of the VCM 13 in the third JIT seek control is as indicated by a solid line in FIG. 7. FIG. 7 is a diagram illustrating a VCM current waveform when the rotation waiting time ΔW is present. FIG. 7 illustrates, as the third JIT seek control, control in a case where the AFC function is enabled in the acceleration section Ta and is not enabled in the deceleration section Td.

In the third JIT seek control, a chart 6211 illustrates a waveform CV61 of the current $i_{VCM}$ of the VCM 13. A chart 6212 illustrates a waveform CV62 of the differential $di_{VCM}/dt$ of the current of the VCM 13.

As indicated by the waveform CV61, in the acceleration section Ta, the current $i_{VCM}$ changes substantially flat on the positive side, and the current $i_{VCM}$ changes along a limit current REF51 near the limit current REF51. In the deceleration section Td, the current $i_{VCM}$ increases to the negative side to the vicinity of a limit current REF52, and the current $i_{VCM}$ changes along the limit current REF52 near the limit current REF52.

The controller 3 divides the flat section A2 (see FIG. 6) into a flat section A21 in which the limit current REF41 is not exceeded on the positive side and a flat section A22 in which the limit current REF41 is exceeded on the positive side when the AFC function is enabled, and changes the instruction value of the current $i_{VCM}$ so as to follow the limit current REF41 in the flat section A22.

In the acceleration section Ta, time t40 to t41 is the rising section A1, time t41 to t42 is the flat section A21, time t42 to t43 is the flat section A22, and time t43 to t44 is the falling section A3.

In the rising section A1, the controller 3 raises the waveform of the current $i_{VCM}$ of the VCM 13 on the positive side. The controller 3 may change the current $i_{VCM}$ of the VCM 13 according to Expression 1.

In the flat section A21, the controller 3 changes the current $i_{VCM}$ of the VCM 13 to be flat. The controller 3 changes the current $i_{VCM}$ of the VCM 13 at an average change rate AR31. The average change rate AR31 can be obtained by averaging the differential $di_{VCM}/dt$ over the time of the flat section A21. The average change rate AR31 is a value close to zero, and may be substantially zero. The controller 3 may maintain the current $i_{VCM}$ of the VCM 13 near the current threshold $i_{thp}$. The current threshold $i_{thp}$ may be a value that is reached at time t41 when the current $i_{VCM}$ is changed according to Expression 1 from time 40.

In the flat section A22, the controller 3 changes the current $i_{VCM}$ of the VCM 13 along the limit current REF51. The controller 3 changes the current $i_{VCM}$ of the VCM 13 at an average change rate AR32. The average change rate AR32 can be obtained by averaging the differential $di_{VCM}/dt$ over the time of the flat section A2. The average change rate AR32 is a value indicating a steeper change than the average change rate AR31, and can be a negative value. The controller 3 may estimate in advance the limit current REF51 in consideration of the counter electromotive voltage $V_{BEMF}$. In the flat section A22, the controller 3 may replace the current instruction value with an estimated value of the limit current REF51.

In the falling section A3, the controller 3 causes the waveform of the current $i_{VCM}$ of the VCM 13 to fall from the positive side to zero at an average change rate AR33. The average change rate AR33 can be obtained by averaging the differential $di_{VCM}/dt$ over the time of the falling section A3. The average change rate AR33 is a value indicating a steeper change than the average change rate AR32 and is a negative value.

In the deceleration section Td, time t45 to t46 is the rising section D1, time t46 to t47 is the flat section D2, and time t47 to t48 is the falling section D3.

In the rising section D1, the controller 3 raises the waveform of the current $i_{VCM}$ of the VCM 13 on the negative side. The controller 3 may change the current $i_{VCM}$ of the VCM 13 according to a mathematical expression in which the polarity of Expression 1 is inverted.

In the flat section D2, the controller 3 changes the current $i_{VCM}$ of the VCM 13 along the limit current REF52. The controller 3 changes the current $i_{VCM}$ of the VCM 13 at an average change rate DR31. The average change rate DR31 can be obtained by averaging the differential $di_{VCM}/dt$ over the time of the flat section D2. The average change rate DR31 is a value indicating a change along the limit current REF52, and may be a positive value. The controller 3 may estimate in advance the limit current REF52 in consideration of the counter electromotive voltage $V_{BEMF}$. In the flat section D2, the controller 3 may replace the current instruction value with a value obtained by adding a predetermined value to an estimated value of the limit current REF52.

In the falling section D3, the controller 3 causes the waveform of the current $i_{VCM}$ of the VCM 13 to fall from the negative side to zero at an average change rate DR32. The average change rate DR32 can be obtained by averaging the differential $di_{VCM}/dt$ over the time of the falling section D3. The average change rate DR32 is a value indicating a steeper change than the average change rate DR31, and is a positive value.

Note that, in FIG. 7, a current waveform of the VCM 13 in the first JIT seek control is indicated by a one-dot chain line for comparison. In the first JIT seek control, the chart 6211 illustrates a waveform CV71 of the current $i_{VCM}$ of the VCM 13. The waveform CV71 is similar to the waveform CV41 (see FIG. 6). The chart 6212 illustrates a waveform CV72 of the differential $di_{VCM}/dt$ of the current of the VCM 13. The waveform CV72 is similar to the waveform CV42 (see FIG. 6).

As compared with the magnitude of the differential $d|i_{VCM}|/dt$ of the absolute value of the current in the flat sections A21 and A22 illustrated in the waveform CV62 in FIG. 7, the magnitude of the differential $d|i_{VCM}|/dt$ of the absolute value of the current in the flat sections A21 and A22 illustrated in the waveform CV72 is closer to zero.

Accordingly, in the third JIT seek control, as compared with the first JIT seek control, the absolute value $|i_{VCM}|$ of the current in the flat sections A21 and A22 can be suppressed, and low power consumption can be achieved.

As described above, in the present embodiment, in the disk device 1, the controller 3 predicts the limit current and causes the current instruction value of the VCM 13 to follow the predicted limit current. The controller 3 adjusts the instruction value of the current $i_{VCM}$ in the flat section A2 to fall within the limit currents REF41 and REF42 while flattening (for example, it is made constant) the instruction value. The controller 3 divides the flat section A2 into the flat section A21 in which the limit currents REF41 and REF42 are not exceeded and the flat section A22 in which the limit currents REF41 and REF42 are exceeded when the AFC function is enabled, and changes the instruction value of the current $i_{VCM}$ so as to follow the limit currents REF41 and REF42 in the flat section A22. Thus, in the disk device 1, the AFC function can be enabled in the limit currents REF41 and REF42, and low power consumption can be achieved while maintaining access performance.

First Modification of Embodiment

Figure 8:
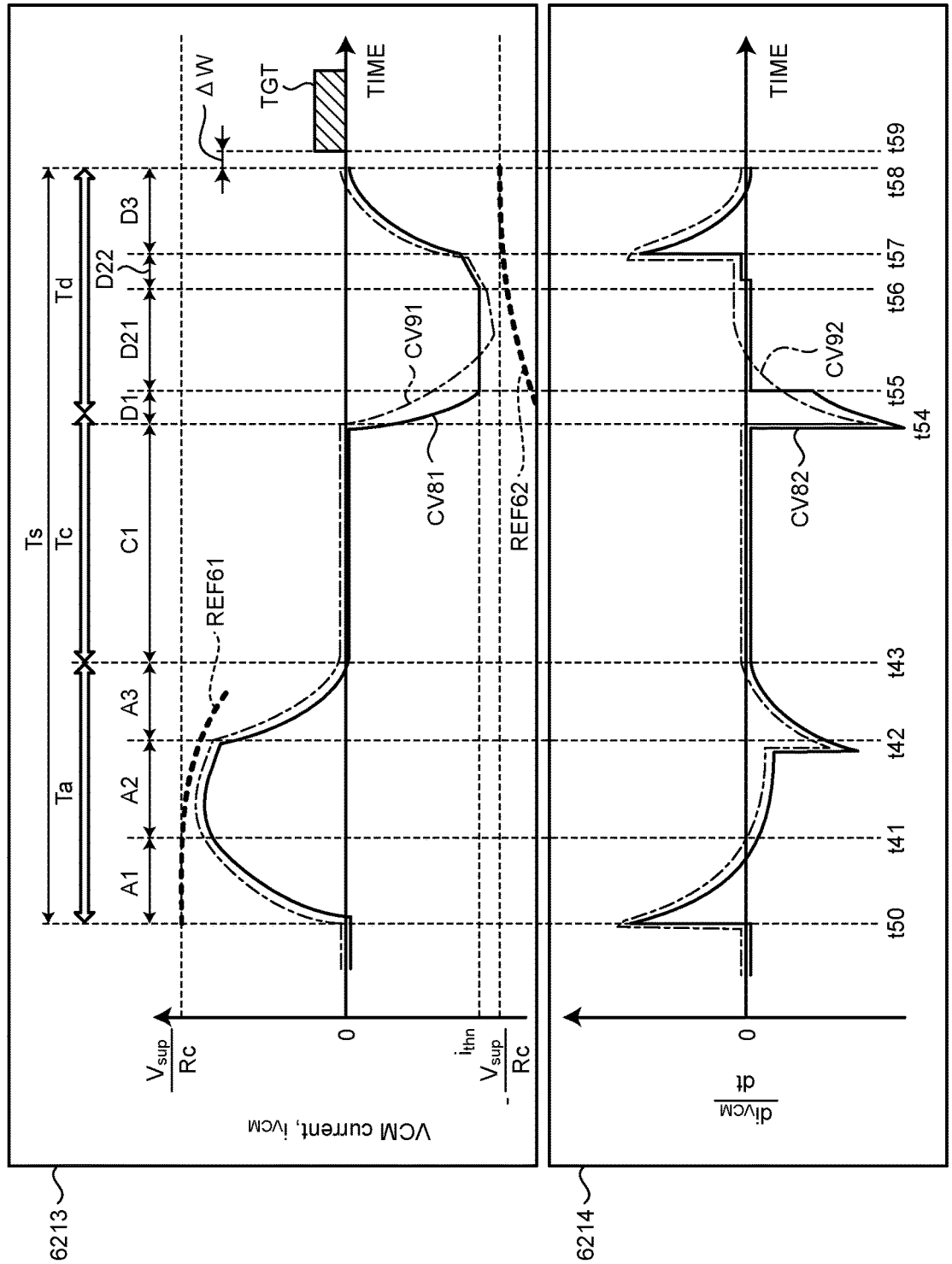
FIG. 8 is a diagram illustrating a VCM current waveform when the rotation waiting time is present in a first modification of the embodiment.

In the third JIT seek control, as indicated by a solid line in FIG. 8, the AFC function may not be enabled in the acceleration section Ta but may be enabled in the deceleration section Td. FIG. 8 is a diagram illustrating a VCM current waveform when the rotation waiting time ΔW is present in a first modification of the embodiment.

In the third JIT seek control, a chart 6213 illustrates a waveform CV81 of the current $i_{VCM}$ of the VCM 13. A chart 6214 illustrates a waveform CV82 of the differential $di_{VCM}/dt$ of the current of the VCM 13.

As indicated by the waveform CV81, in the acceleration section Ta, the current $i_{VCM}$ increases to the positive side to the vicinity of the limit current REF51, and the current $i_{VCM}$ changes along a limit current REF61 near the limit current REF61. In the deceleration section Td, the current $i_{VCM}$ changes substantially flat on the negative side, and the current $i_{VCM}$ changes along a limit current REF62 near the limit current REF62.

In the acceleration section Ta, time t50 to t51 is the rising section A1, time t51 to t52 is the flat section A2, and time t52 to t53 is the falling section A3.

In the rising section A1, the controller 3 raises the waveform of the current $i_{VCM}$ of the VCM 13 on the positive side. The controller 3 may change the current $i_{VCM}$ of the VCM 13 according to Expression 1.

In the flat section A2, the controller 3 changes the current $i_{VCM}$ of the VCM 13 along the limit current REF61. The controller 3 changes the current $i_{VCM}$ of the VCM 13 at an average change rate AR41. The average change rate AR41 can be obtained by averaging the differential $di_{VCM}/dt$ over the time of the flat section A2. The average change rate AR41 is a value indicating a change along the limit current REF61 and may be a negative value. The controller 3 may estimate in advance the limit current REF61 in consideration of the counter electromotive voltage $V_{BEMF}$. In the flat section A2, the controller 3 may replace the current instruction value with an estimated value of the limit current REF31.

In the falling section A3, the controller 3 causes the waveform of the current $i_{VCM}$ of the VCM 13 to fall from the positive side to zero at an average change rate AR42. The average change rate AR42 can be obtained by averaging the differential $di_{VCM}/dt$ over the time of the falling section A3. The average change rate AR42 is a value indicating a steeper change than the average change rate AR41 and is a negative value.

The controller 3 divides the flat section D2 (see FIG. 6) into a flat section D21 in which a value obtained by adding a predetermined value to the limit current REF62 is not exceeded on the negative side and a flat section D22 in which the value is exceeded on the negative side when the AFC function is enabled, and changes the instruction value of the current $i_{VCM}$ to follow the limit current REF62 in the flat section D22.

In the deceleration section Td, time t54 to t55 is the rising section D1, time t55 to t56 is the flat section D21, time t56 to t57 is the flat section D21, and time t57 to t58 is the falling section D3.

In the rising section D1, the controller 3 raises the waveform of the current $i_{VCM}$ of the VCM 13 on the negative side. The controller 3 may change the current $i_{VCM}$ of the VCM 13 according to a mathematical expression in which the polarity of Expression 1 is inverted.

In the flat section D21, the controller 3 changes the current $i_{VCM}$ of the VCM 13 to be flat. The controller 3 changes the current $i_{VCM}$ of the VCM 13 at an average change rate DR41. The average change rate DR41 can be obtained by averaging the differential $di_{VCM}/dt$ over the time of the flat section D21. The average change rate DR41 is a value close to zero, and may be substantially zero. The controller 3 may maintain the current $i_{VCM}$ of the VCM 13 near the current threshold $i_{thp}$. The current threshold $i_{thp}$ may be a value that is reached at time t55 when the current $i_{VCM}$ is changed according to a mathematical expression in which the polarity of Expression 1 is inverted from the time 55.

In the flat section D22, the controller 3 changes the current $i_{VCM}$ of the VCM 13 along the limit current REF62. The controller 3 changes the current $i_{VCM}$ of the VCM 13 at an average change rate DR42. The average change rate DR42 can be obtained by averaging the differential $di_{VCM}/dt$ over the time of the flat section D22. The average change rate DR42 is a value indicating a steeper change than the average change rate DR41, and can be a positive value. The controller 3 may estimate in advance the limit current REF62 in consideration of the counter electromotive voltage $V_{BEMF}$. In the flat section D22, the controller 3 may replace the current instruction value with a value obtained by adding a predetermined value to an estimated value of the limit current REF62.

In the falling section D3, the controller 3 causes the waveform of the current $i_{VCM}$ of the VCM 13 to fall from the negative side to zero at an average change rate DR43. The average change rate DR43 can be obtained by averaging the differential $di_{VCM}/dt$ over the time of the falling section D3. The average change rate DR43 is a value indicating a steeper change than the average change rate DR42, and is a positive value.

Note that, in FIG. 8, the current waveform of the VCM 13 in the first JIT seek control is indicated by a one-dot chain line for comparison. In the first JIT seek control, the chart 6213 illustrates a waveform CV91 of the current $i_{VCM}$ of the VCM 13. The waveform CV91 is similar to the waveform CV41 (see FIG. 6). The chart 6214 illustrates a waveform CV92 of the differential $di_{VCM}/dt$ of the current of the VCM 13. The waveform CV92 is similar to the waveform CV42 (see FIG. 6).

As compared with the magnitude of the differential $d|i_{VCM}|/dt$ of the absolute value of the current in the flat sections D21 and D22 illustrated in the waveform CV92 in FIG. 8, the magnitude of the differential $d|i_{VCM}|/dt$ of the absolute value of the current in the flat sections D21 and D22 illustrated in the waveform CV82 is closer to zero.

Accordingly, in the third JIT seek control, as compared with the first JIT seek control, the absolute value $|i_{VCM}|$ of the current in the flat sections D21 and D22 can be suppressed, and low power consumption can be achieved.

In this manner, the controller 3 divides the flat section D2 into the flat section D21 in which a value obtained by adding a predetermined value to the limit current REF42 is not exceeded on the negative side and the flat section D22 in which the value is exceeded on the negative side when the AFC function is enabled, and changes the instruction value of the current $i_{VCM}$ to follow the limit current REF62 in the flat section D22. Thus, in the disk device 1, the AFC function can be enabled in the limit currents REF61 and REF62, and low power consumption can be achieved while maintaining access performance.

Second Modification of Embodiment

Figure 9:
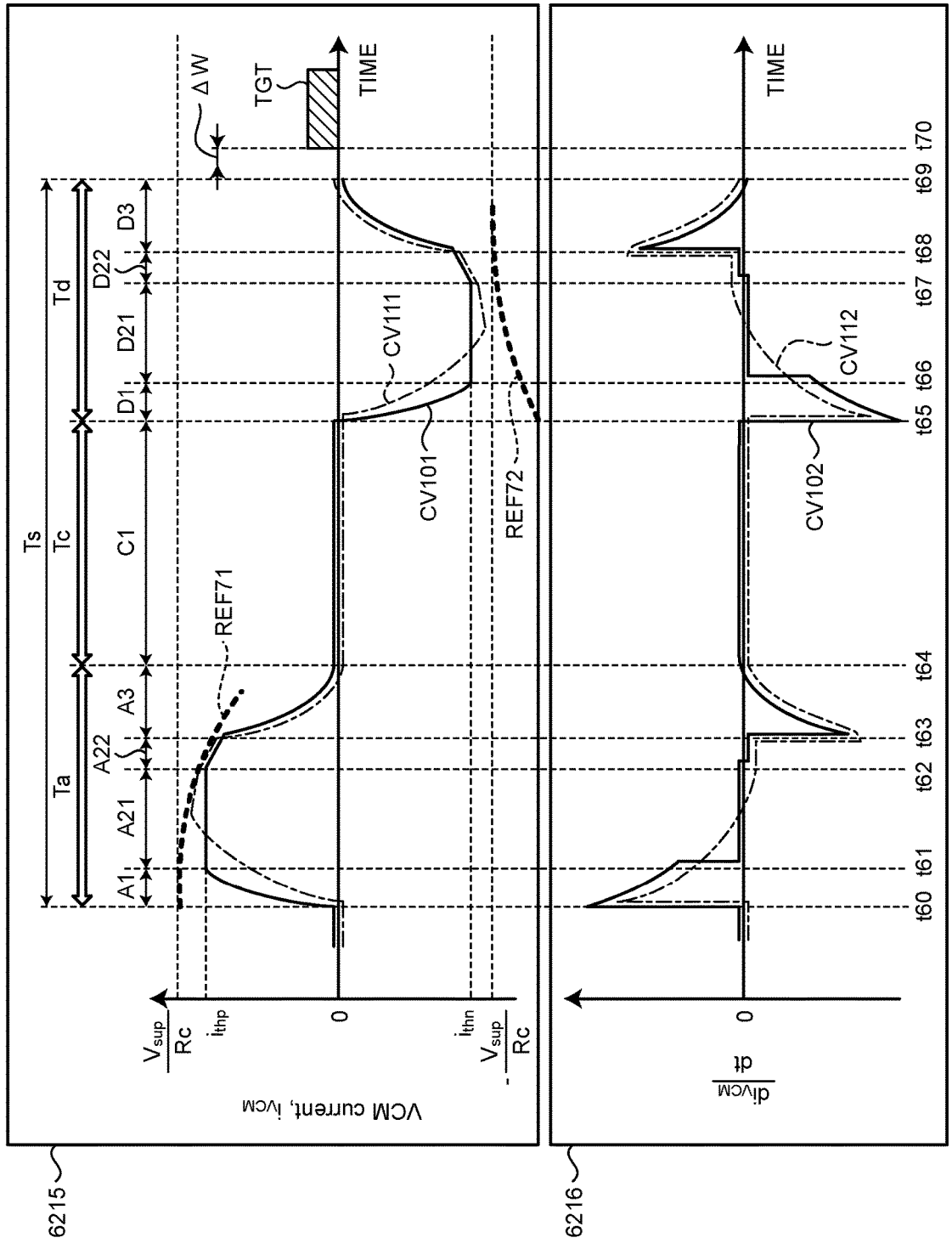
FIG. 9 is a diagram illustrating a VCM current waveform when the rotation waiting time is present in a second modification of the embodiment.

In the third JIT seek control, as indicated by a solid line in FIG. 9, the AFC function may be enabled in both the acceleration section Ta and the deceleration section Td. FIG. 9 is a diagram illustrating a VCM current waveform when the rotation waiting time ΔW is present in a second modification of the embodiment.

In the third JIT seek control, a chart 6215 illustrates a waveform CV101 of the current $i_{VCM}$ of the VCM 13. A chart 6216 illustrates the waveform CV102 of the differential $di_{VCM}/dt$ of the current of the VCM 13.

As indicated by the waveform CV101, in the acceleration section Ta, the current $i_{VCM}$ changes substantially flat on the positive side, and the current $i_{VCM}$ changes along a limit current REF71 near the limit current REF71. In the deceleration section Td, the current $i_{VCM}$ changes substantially flat on the negative side, and the current $i_{VCM}$ changes along a limit current REF72 near the limit current REF72.

The controller 3 divides the flat section A2 (see FIG. 6) into the flat section A21 in which the limit current REF71 is not exceeded on the positive side and the flat section A22 in which the limit current REF71 is exceeded on the positive side when the AFC function is enabled, and changes the instruction value of the current $i_{VCM}$ so as to follow the limit current REF71 in the flat section A22.

In the acceleration section Ta, time t60 to t61 is the rising section A1, time t61 to t62 is the flat section A21, time t62 to t63 is the flat section A22, and time t63 to t64 is the falling section A3.

In the rising section A1, the controller 3 raises the waveform of the current $i_{VCM}$ of the VCM 13 on the positive side. The controller 3 may change the current $i_{VCM}$ of the VCM 13 according to Expression 1.

In the flat section A21, the controller 3 changes the current $i_{VCM}$ of the VCM 13 to be flat. The controller 3 changes the current $i_{VCM}$ of the VCM 13 at an average change rate AR51. The average change rate AR51 can be obtained by averaging the differential $di_{VCM}/dt$ over the time of the flat section A21. The average change rate AR51 is a value close to zero, and may be substantially zero. The controller 3 may maintain the current $i_{VCM}$ of the VCM 13 near the current threshold $i_{thp}$. The current threshold $i_{thp}$ may be a value that is reached at time t41 when the current $i_{VCM}$ is changed according to Expression 1 from time 40.

In the flat section A22, the controller 3 changes the current $i_{VCM}$ of the VCM 13 along the limit current REF71. The controller 3 changes the current $i_{VCM}$ of the VCM 13 at an average change rate AR52. The average change rate AR52 can be obtained by averaging the differential $di_{VCM}/dt$ over the time of the flat section A2. The average change rate AR52 is a value indicating a steeper change than the average change rate AR51, and can be a negative value. The controller 3 may estimate in advance the limit current REF71 in consideration of the counter electromotive voltage $V_{BEMF}$. In the flat section A22, the controller 3 may replace the current instruction value with an estimated value of the limit current REF71.

In the falling section A3, the controller 3 causes the waveform of the current $i_{VCM}$ of the VCM 13 to fall from the positive side to zero at an average change rate AR53. The average change rate AR53 can be obtained by averaging the differential $di_{VCM}/dt$ over the time of the falling section A3. The average change rate AR53 is a value indicating a steeper change than the average change rate AR52 and is a negative value.

In the deceleration section Td, time t65 to t66 is the rising section D1, time t66 to t67 is the flat section D21, time t67 to t68 is the flat section D22, and time t68 to t69 is the falling section D3.

The controller 3 divides the flat section D2 (see FIG. 6) into the flat section D21 in which a value obtained by adding a predetermined value to the limit current REF72 is not exceeded on the negative side and the flat section D22 in which the value is exceeded on the negative side when the AFC function is enabled, and changes the instruction value of the current $i_{VCM}$ to follow the limit current REF72 in the flat section D22.

In the rising section D1, the controller 3 raises the waveform of the current $i_{VCM}$ of the VCM 13 on the negative side. The controller 3 may change the current $i_{VCM}$ of the VCM 13 according to a mathematical expression in which the polarity of Expression 1 is inverted.

In the flat section D21, the controller 3 changes the current $i_{VCM}$ of the VCM 13 to be flat. The controller 3 changes the current $i_{VCM}$ of the VCM 13 at an average change rate DR51. The average change rate DR51 can be obtained by averaging the differential $di_{VCM}/dt$ over the time of the flat section D21. The average change rate DR51 is a value close to zero, and may be substantially zero. The controller 3 may maintain the current $i_{VCM}$ of the VCM 13 near the current threshold $i_{thp}$. The current threshold $i_{thp}$ may be a value that is reached at time t66 when the current $i_{VCM}$ is changed according to a mathematical expression in which the polarity of Expression 1 is inverted from the time 65.

In the flat section D22, the controller 3 changes the current $i_{VCM}$ of the VCM 13 along the limit current REF72. The controller 3 changes the current $i_{VCM}$ of the VCM 13 at an average change rate DR52. The average change rate DR52 can be obtained by averaging the differential $di_{VCM}/dt$ over the time of the flat section D22. The average change rate DR52 is a value indicating a steeper change than the average change rate DR51, and can be a positive value. The controller 3 may estimate in advance the limit current REF72 in consideration of the counter electromotive voltage $V_{BEMF}$. In the flat section D22, the controller 3 may replace the current instruction value with a value obtained by adding a predetermined value to an estimated value of the limit current REF72.

In the falling section D3, the controller 3 causes the waveform of the current $i_{VCM}$ of the VCM 13 to fall from the negative side to zero at an average change rate DR53. The average change rate DR53 can be obtained by averaging the differential $di_{VCM}/dt$ over the time of the falling section D3. The average change rate DR53 is a value indicating a steeper change than the average change rate DR52, and is a positive value.

Note that, in FIG. 9, a current waveform of the VCM 13 in the first JIT seek control is indicated by a one-dot chain line for comparison. In the first JIT seek control, the chart 6215 illustrates a waveform CV111 of the current $i_{VCM}$ of the VCM 13. The waveform CV111 is similar to the waveform CV41 (see FIG. 6). The chart 6216 illustrates a waveform CV112 of the differential $di_{VCM}/dt$ of the current of the VCM 13. The waveform CV112 is similar to the waveform CV42 (see FIG. 6).

As compared with the magnitude of the differential $d|i_{VCM}|/dt$ of the absolute value of the current in the flat sections A21, A22, D21, and D22 illustrated in the waveform CV112 in FIG. 9, the magnitude of the differential $d|i_{VCM}|/dt$ of the absolute value of the current in the flat sections A21, A22, D21, and D22 illustrated in the waveform CV112 is closer to zero.

Accordingly, in the third JIT seek control, as compared with the first JIT seek control, the absolute value $|i_{VCM}|$ of the current in the flat sections A21, A22, D21, and D22 can be suppressed, and low power consumption can be achieved.

In this manner, the controller 3 divides the flat section A2 (see FIG. 6) into the flat section A21 in which the limit current REF71 is not exceeded on the positive side and the flat section A22 in which the limit current REF71 is exceeded on the positive side when the AFC function is enabled, and changes the instruction value of the current $i_{VCM}$ so as to follow a limit current REF71 in the flat section A22. The controller 3 divides the flat section D2 (see FIG. 6) into the flat section D21 in which a value obtained by adding a predetermined value to the limit current REF72 is not exceeded on the negative side and the flat section D22 in which the value is exceeded on the negative side when the AFC function is enabled, and changes the instruction value of the current $i_{VCM}$ to follow the limit current REF72 in the flat section D22. Thus, in the disk device 1, the AFC function can be enabled in the limit currents REF71 and REF72, and low power consumption can be achieved while maintaining access performance.

Third Modification of Embodiment

Figure 10:
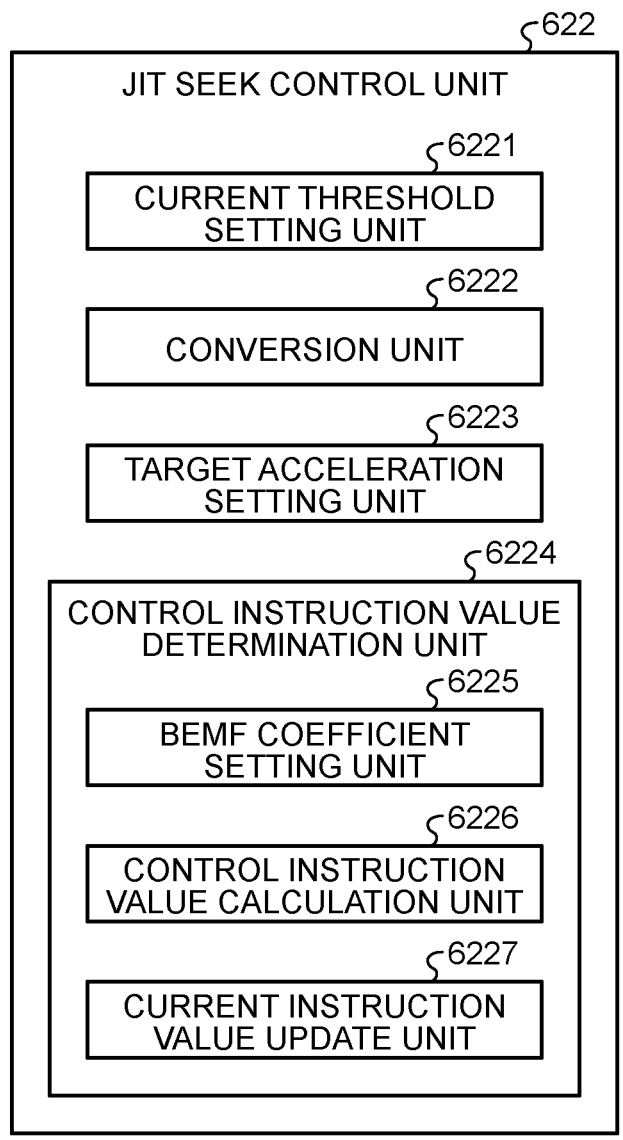
FIG. 10 is a diagram illustrating a functional configuration of a JIT seek control unit in a third modification of the embodiment.

The third JIT seek control may be implemented in the JIT seek control unit 622 (see FIG. 1) as illustrated in FIG. 10. FIG. 10 is a diagram illustrating a functional configuration of the JIT seek control unit 622.

The JIT seek control unit 622 sets a target acceleration and sets the current instruction value of the VCM 13 in consideration of the target acceleration and a back electromotive force (BEMF) coefficient.

When the BEMF coefficient $k_{BEMF}$ is considered, the current $i_{VCM}$ of the VCM 13 in the rising section A1 and the flat section A2 illustrated in FIG. 3 can be expressed by the following Expression 1'.

$$V_{set} = R_C i_{VCM} + L_{VCM} \frac{di_{VCM}}{dt} + V_{BEMF\_set} \quad \text{Expression 1'}$$

In Expression 1', $V_{BEMF\_set}$ is a counter electromotive voltage, and can be expressed by the following Expression 2'.

$$V_{BEMF\_set} = k_{BEMF} K_f v \quad \text{Expression 2'}$$

As indicated in Expressions 1' and 2', the BEMF coefficient $k_{BEMF}$ is a coefficient that changes the degree of influence of the counter electromotive voltage $V_{BEMF}$ on the instruction value of the current $i_{VCM}$ of the VCM 13.

The JIT seek control unit 622 illustrated in FIG. 10 includes a current threshold setting unit 6221, a conversion unit 6222, a target acceleration setting unit 6223, and a control instruction value determination unit 6224 as a configuration for performing the third JIT seek control. The control instruction value determination unit 6224 includes a BEMF coefficient setting unit 6225, a control instruction value calculation unit 6226, and a current instruction value update unit 6227.

The current threshold setting unit 6221 sets a current threshold $I_{th}$ for limiting the absolute value $|i_{VCM}|$ of the current of the VCM 13.

For example, the current threshold setting unit 6221 may set a current threshold $i_{thp}$ that limits the current $i_{VCM}$ of the VCM 13 in the flat section A2 (see FIG. 6) of the acceleration section Ta. The current threshold setting unit 6221 may set a current threshold $i_{thn}$ that limits the current $i_{VCM}$ of the VCM 13 in the flat section D2 (see FIG. 6) of the acceleration section Ta.

The conversion unit 6222 converts the current threshold $I_{th}$ set by the current threshold setting unit 6221 into an acceleration threshold $a_{th}$.

For example, the conversion unit 6222 converts a current threshold $I_{thp}$ in the flat section A2 into an acceleration threshold $a_{thp}$ in the flat section A2 by the following Expression 7.

$$a_{thp} = \frac{K_f}{m} i_{thp} \quad \text{Expression 7}$$

The conversion unit 6222 converts the current threshold $I_{thn}$ in the flat section D2 into an acceleration threshold $a_{thn}$ in the flat section D2 by the following Expression 8.

$$a_{thn} = \frac{K_f}{m} i_{thn} \quad \text{Expression 8}$$

The target acceleration setting unit 6223 receives the acceleration threshold $a_{th}$ corresponding to the current threshold $I_{th}$. For example, the target acceleration setting unit 6223 may receive the acceleration threshold $a_{thp}$ according to the current threshold $i_{thp}$, or may receive the acceleration threshold $a_{thn}$ according to the current threshold $i_{thn}$. The target acceleration setting unit 6223 sets a target acceleration $a_{tgt}$ according to the acceleration threshold $a_{th}$. The target acceleration setting unit 6223 supplies the target acceleration $a_{tgt}$ to the control instruction value calculation unit 6226.

The BEMF coefficient setting unit 6225 sets the BEMF coefficient $k_{BEMF}$. The BEMF coefficient setting unit 6225 supplies the BEMF coefficient $k_{BEMF}$ to the control instruction value calculation unit 6226.

As the control instruction value calculation unit 6226, a controller considering the BEMF is used. The control instruction value calculation unit 6226 receives the target position $P_{tgt}$ and the target velocity $V_{tgt}$, receives the target acceleration $a_{tgt}$ from the target acceleration setting unit 6223, and receives the BEMF coefficient $k_{BEMF}$ from the BEMF coefficient setting unit 6225. The control instruction value calculation unit 6226 calculates the current instruction value of the VCM 13 using the target position $P_{tgt}$, the target velocity $V_{tgt}$, the target acceleration $a_{tgt}$, and the BEMF coefficient $k_{BEMF}$.

For example, the control instruction value calculation unit 6226 calculates the current instruction value as follows. In the rising section A1, it rises on the positive side according to Expression 1', is substantially maintained at the current threshold $i_{thp}$ in the flat section A2, and falls from the positive side according to the time constant of the circuit 131 in the falling section A3. In the flat section C1, it is maintained at substantially zero. In the rising section D1, it rises on the negative side according to a mathematical expression in which the polarity of Expression 1' is inverted, is substantially maintained at the current threshold $i_{thp}$ in the flat section D2, and falls from the negative side according to the time constant of the circuit 131 in the falling section D3 (see FIG. 6).

The current instruction value update unit 6227 estimates a limit current in consideration of the counter electromotive voltage in advance. The current instruction value update unit 6227 may estimate the time-series characteristic (for example, the limit current REF71 illustrated in FIG. 9) of the limit current. Upon receiving the current instruction value from the control instruction value calculation unit 6226, the current instruction value update unit 6227 updates the current instruction value by adjusting the current instruction value so as to be within the limit current, or the like. The current instruction value update unit 6227 may specify a portion exceeding the limit current in the current instruction value and replace the current instruction value of the exceeding portion with the limit current (or a value corresponding to the limit current).

For example, the current instruction value update unit 6227 may compare the current instruction value with the limit current, and divide the flat section A2 into the flat section A21 in which the limit current REF71 is not exceeded on the positive side and the flat section A22 in which the limit current REF71 is exceeded on the positive side (see FIG. 9). The current instruction value update unit 6227 may replace the portion of the flat section A22 in the current instruction value with the limit current REF71. Accordingly, the current instruction value update unit 6227 may finely correct a portion after the falling section A3.

The current instruction value update unit 6227 may compare the current instruction value with the limit current, and divide the flat section D2 into the flat section D21 in which a value obtained by adding a predetermined value to the limit current REF72 is not exceeded on the negative side and the flat section D22 in which the value is exceeded on the negative side (see FIG. 9). The current instruction value update unit 6227 may replace the portion of the flat section A22 in the current instruction value with a value obtained by adding a predetermined value to the limit current REF72. Accordingly, the current instruction value update unit 6227 may finely correct a portion after the falling section A3.

The current instruction value update unit 6227 outputs the updated current instruction value.

Figure 11:
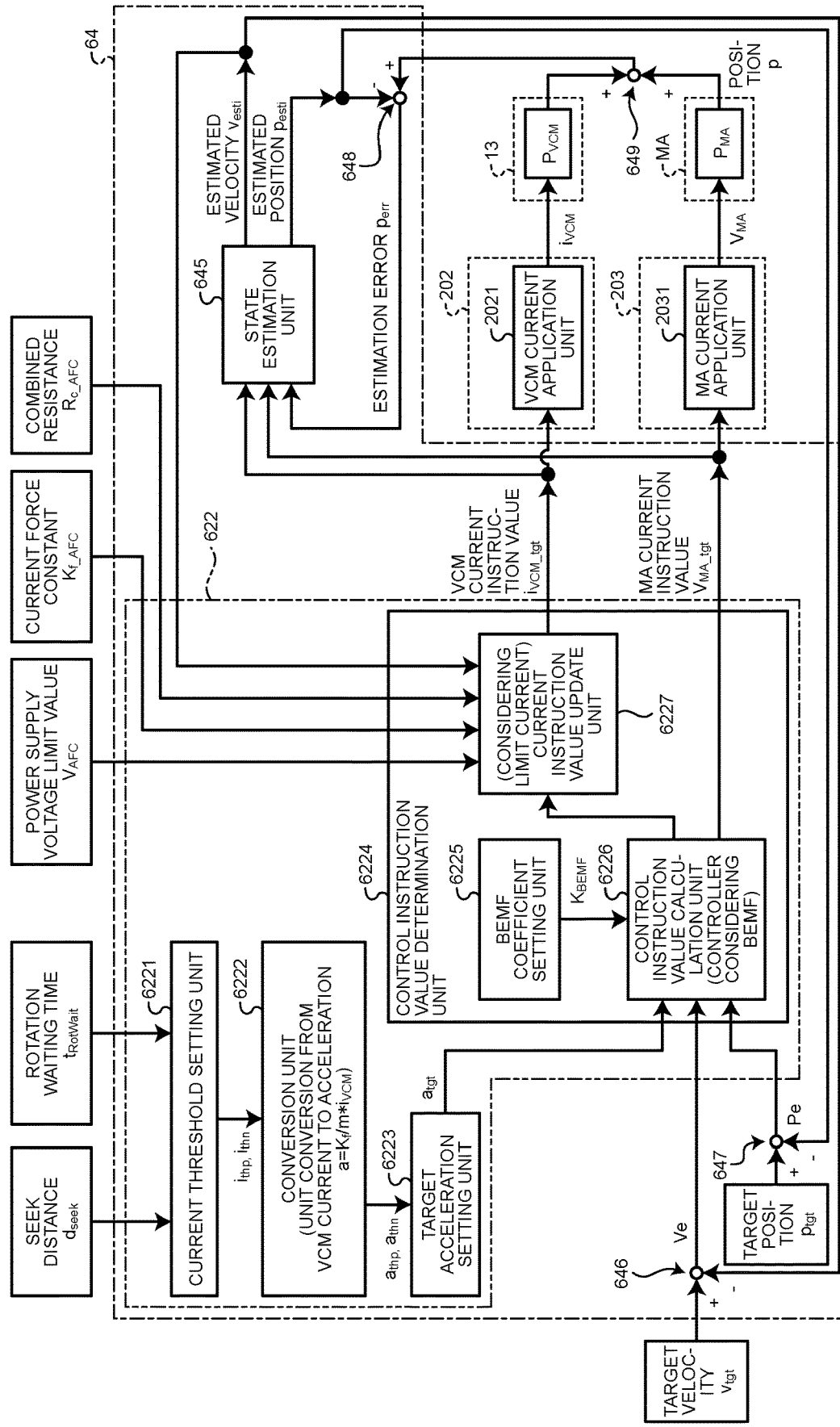
FIG. 11 is a diagram illustrating a functional configuration of a servo control unit in the third modification of the embodiment.

As illustrated in FIG. 11, the third JIT seek control may be implemented in the servo control unit 64 (see FIG. 1). FIG. 11 is a diagram illustrating a functional configuration of a servo control unit 64 in a third modification of the embodiment.

The servo control unit 64 includes a state estimation unit 645, subtractors 646 to 648, and an adder 649 in addition to the JIT seek control unit 622. The JIT seek control unit 622 has a configuration similar to that of FIG. 10.

The control instruction value determination unit 6224 determines the current instruction value $i_{VCM\_tgt}$ on the basis of the target acceleration $a_{tgt}$, the target velocity $V_{tgt}$, the target position $P_{tgt}$, and the like. The control instruction value determination unit 6224 may determine the current instruction value $i_{VCM\_tgt}$ by applying the target acceleration $a_{tgt}$ to Expression 3. The control instruction value determination unit 6224 supplies the current instruction value $i_{VCM\_tgt}$ to a VCM current application unit 2021 of the VCM control unit 202. The VCM current application unit 2021 applies a current to a plant $P_{VCM}$ of the VCM 13 according to the current instruction value $i_{VCM\_tgt}$. The plant $P_{VCM}$ corresponds to a transfer function of the VCM 13.

The control instruction value determination unit 6224 determines a voltage instruction value $V_{MA\_tgt}$ on the basis of the target acceleration $a_{tgt}$, the target velocity $V_{tgt}$, the target position $P_{tgt}$, and the like. The control instruction value determination unit 6224 supplies the voltage instruction value $V_{MA\_tgt}$ to an MA voltage application unit 2031 of the MA control unit 203. The MA voltage application unit 2031 applies a voltage to a plant $P_{MA}$ of the microactuator MA according to the voltage instruction value $V_{MA\_tgt}$. The plant $P_{MA}$ corresponds to a transfer function of the microactuator MA.

The state estimation unit 645 receives the current instruction value $i_{VCM\_tgt}$ from the control instruction value determination unit 6224, and obtains an estimated position $p_{esti}$ and an estimated velocity $v_{esti}$ of the head MH on the basis of a current instruction value $I_{tgt\_d}$ by using an observer.

The adder 649 adds the signal from the plant $P_{VCM}$ and the signal from the plant $P_{MA}$ to obtain the position P of the head H, and supplies the position P to the subtractor 648.

The subtractor 648 subtracts the estimated position $P_{esti}$ from the position P of the head H, obtains the estimation error $P_{err}$, and feeds back the estimation error $P_{err}$ to the state estimation unit 645.

The state estimation unit 645 corrects a state estimated value (estimated position $p_{esti}$ and estimated velocity $v_{esti}$) of the head MH so that the estimation error $P_{err}$ approaches zero.

The subtractor 646 subtracts the estimated velocity $v_{esti}$ from the target velocity $v_{tgt}$, obtains a velocity error $v_e$, and supplies the velocity error $v_e$ to the control instruction value determination unit 6224.

The subtractor 647 subtracts the estimated position $P_{esti}$ from the target position $P_{tgt}$, obtains the position error $P_e$, and supplies the position error Pe to the control instruction value determination unit 6224.

For example, the control instruction value determination unit 6224 enables the AFC function in the flat sections A2 and D2 (see FIG. 6).

In the control instruction value determination unit 6224, the current threshold setting unit 6221 refers to a table in the firmware or the nonvolatile memory 90 using any one of or a combination of the seek distance $d_{seek}$, the rotation waiting time $t_{RotWait}$, the supply voltage $V_{sup}$, the environmental temperature, and the VCM temperature at the start of a seek. Thus, the current threshold setting unit 6221 sets the current threshold $i_{thp}$ for the acceleration section Ta and the current threshold $i_{thn}$ for the deceleration section Td.

The conversion unit 6226 converts the current threshold $i_{thp}$ for the acceleration section Ta and the current threshold $i_{thn}$ for the deceleration section Td into the acceleration threshold $a_{thp}$ for the acceleration section Ta and the acceleration threshold $a_{thn}$ for the deceleration section Td, respectively, by Expression 7 and Expression 8.

The target acceleration setting unit 6223 sets the obtained acceleration threshold $a_{thp}$ for the acceleration section Ta and the obtained acceleration threshold $a_{thn}$ for the deceleration section Td as the target acceleration $a_{tgt}$. The target acceleration setting unit 6223 supplies the target acceleration $a_{tgt}$ to the control instruction value calculation unit 6226.

In response to this, the control instruction value calculation unit 6226 calculates a current instruction value (see FIG. 6) that changes flatly in the flat sections A2 and D2.

The BEMF coefficient setting unit 6225 sets the BEMF coefficient $k_{BEMF}$. The BEMF coefficient setting unit 6225 and the BEMF coefficient setting unit 6225 supply the BEMF coefficient $k_{BEMF}$ to the control instruction value calculation unit 6226.

In response to this, the control instruction value calculation unit 6226 calculates the current instruction value while considering the degree of influence of the counter electromotive voltage on the basis of the BEMF coefficient $k_{BEMF}$.

Here, the BEMF coefficient setting unit 6225 can change the average change rate of the current instruction value by changing the BEMF coefficient $k_{BEMF}$. For example, the BEMF coefficient setting unit 6225 sets the BEMF coefficient $k_{BEMF}$ within a range of 0 to 1 in order to reduce the average change rate of the current instruction value. Thus, the absolute value of the counter electromotive voltage $V_{BEMF\_set}$ calculated by Expression 2' can be reduced, and the average change rate of the current instruction value can be reduced by using the counter electromotive voltage $V_{BEMF\_set}$ calculated as in Expression 1' on a circuit equation.

The control instruction value calculation unit 6226 supplies the current instruction value to the current instruction value update unit 6227.

The current instruction value update unit 6227 obtains an assumed limit current $i_{VCM\_AFC\_limit}$.

For example, the current instruction value update unit 6227 calculates the assumed limit current $i_{VCM\_AFC\_limit}$ by the following Expression 9 using a power supply voltage limit value $V_{AFC}$, a current force constant $K_{f\_AFC}$ including the VCM, a combined resistance $R_{C\_AFC}$ including the VCM 13, and a radial velocity v of the head H obtained from any one of a measurement value, an estimated value, and a design value.

$$i_{VCM\_AFC\_limit} = \frac{V_{AFC} - K_{f\_AFC} v}{R_{c\_AFC}} \qquad \text{Expression 9}$$

The power supply voltage limit value $V_{AFC}$ may be a minimum value (worst value) in design of the disk device 1 or may be a value measured during operation of the disk device 1. The current force constant $K_{f\_AFC}$ may be a minimum value (worst value) in design of the disk device 1 or may be a value measured during operation of the disk device 1. The combined resistance $R_{C\_AFC}$ including the VCM 13 may be a design maximum value (worst value) of the disk device 1 or a value measured during operation of the disk device 1. As the radial velocity v of the head H, a differential value of the position p or the estimated velocity $v_{esti}$ estimated by the state estimation unit may be used.

A combined resistance value $R_C$ can be estimated by the following Expression 10, for example, in a state where the set voltage $V_{set}$ (see FIG. 4), the current force constant $K_f$, the radial velocity v of the head H, and the current $i_{VCM}$ of the VCM 13 are known at a specific time (servo sample) in a saturated acceleration section.

$$R_c = \frac{V_{sup} - K_f v}{i_{VCM}} \qquad \text{Expression 10}$$

In addition, during the seek operation including the saturated acceleration section, the combined resistance $R_{C\_AFC}$ including the VCM 13 can be estimated. During the seek operation not including the saturated acceleration section, the combined resistance $R_C$ obtained by estimating the heat dissipation of the coil of the VCM 13 due to the elapsed time and the heat dissipation of the coil of the VCM 13 due to the seek operation not including the saturated acceleration section with respect to the combined resistance $R_C$ estimated during the seek operation including the saturated acceleration section may be used.

The current instruction value update unit 6227 compares the absolute value of the current instruction value with the absolute value of the assumed limit current $i_{VCM\_AFC\_limit}$. When the absolute value of the current instruction value exceeds the absolute value of the assumed limit current $i_{VCM\_AFC\_limit}$ (or a value obtained by subtracting a predetermined value from the absolute value), the current instruction value update unit 6227 performs processing of updating the current instruction value to the assumed limit current $i_{VCM\_AFC\_limit}$.

Thus, equivalently, the current instruction value update unit 6227 divides the flat section A2 (see FIG. 6) into the flat section A21 in which the limit current REF71 is not exceeded on the positive side and the flat section A22 in which the limit current REF71 is exceeded on the positive side when the AFC function is enabled, and changes the indication value of the current $i_{VCM}$ so as to follow the limit current REF71 in the flat section A22 (see FIG. 9).

Equivalently, the current instruction value update unit 6227 divides the flat section D2 (see FIG. 6) into the flat section D21 in which a value obtained by adding a predetermined value to the limit current REF72 is not exceeded on the negative side and the flat section D22 in which the value is exceeded on the negative side when the AFC function is enabled, and changes the indication value of the current $i_{VCM}$ so as to follow the limit current REF72 in the flat section D22 (see FIG. 9).

The current instruction value update unit 6227 supplies the updated current instruction value $i_{VCM\_tgt}$ to the VCM current application unit 2021.

FIGS. 10 and 11 illustrate the operation when the controller 3 performs the seek control illustrated in FIG. 9, but when the controller 3 performs the seek control illustrated in FIG. 7, the operation related to the current threshold $i_{thn}$ is omitted. Alternatively, when the controller 3 performs the seek control illustrated in FIG. 8, the operation related to the current threshold $i_{thp}$ is omitted.

Also with such a configuration, in the disk device 1, the AFC function can be enabled in the limit currents REF71 and REF72, and low power consumption can be achieved while maintaining access performance.

Fourth Modification of Embodiment

Figure 12:
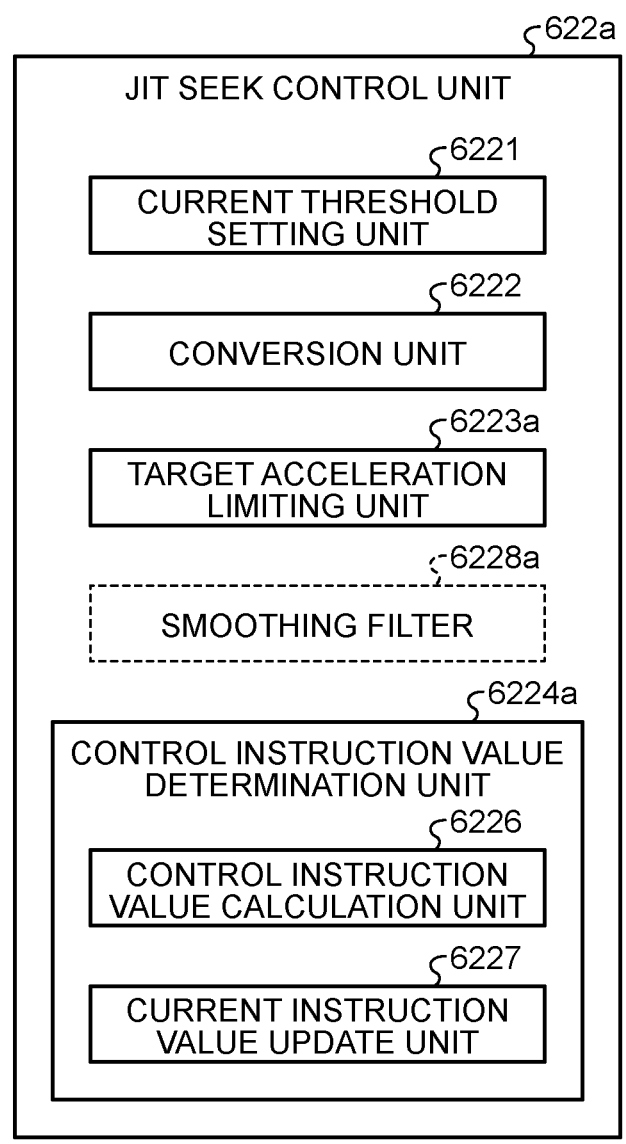
FIG. 12 is a diagram illustrating a functional configuration of a JIT seek control unit in a fourth modification of the embodiment.

The third JIT seek control may be implemented in a JIT seek control unit 622a as illustrated in FIG. 12. FIG. 12 is a diagram illustrating a functional configuration of the JIT seek control unit 622a in a fourth modification of the embodiment.

The JIT seek control unit 622a obtains an acceleration threshold according to the current threshold, limits the target acceleration according to the acceleration threshold, and sets the current instruction value of the VCM 13.

The JIT seek control unit 622a includes a target acceleration limiting unit 6223a and a control instruction value determination unit 6224a instead of the target acceleration setting unit 6223 and the control instruction value determination unit 6224 (see FIG. 10). In the control instruction value determination unit 6224a, the BEMF coefficient setting unit 6225 is omitted.

The target acceleration limiting unit 6223a receives the target acceleration $a_{tgt}$ and receives the acceleration threshold $a_{th}$ from the conversion unit 6222, and performs a clipping process of the target acceleration $a_{tgt}$ using the acceleration threshold $a_{th}$. For example, the target acceleration limiting unit 6223a clips a portion corresponding to the flat section A2 in the acceleration threshold $a_{th}$ with the acceleration threshold $a_{thp}$, and clips a portion corresponding to the flat section D2 in the acceleration threshold $a_{th}$ with the acceleration threshold $a_{thn}$. The target acceleration limiting unit 6223a supplies the target acceleration $a_{tgt}$ after the clipping process to the control instruction value determination unit 6224a.

In the control instruction value determination unit 6224a, the control instruction value calculation unit 6226 calculates the current instruction value of the VCM 13 on the basis of the target acceleration $a_{tgt}$, the target velocity $V_{tgt}$, the target position $P_{tgt}$, and the like without using the BEMF coefficient $k_{BEMF}$.

For example, the control instruction value calculation unit 6226 calculates the current instruction value as follows. In the rising section A1, it rises on the positive side according to Expression 1 and Expression 2, is substantially maintained at the current threshold $i_{thp}$ in the flat section A2, and falls from the positive side according to the time constant of the circuit 131 in the falling section A3. In the flat section C1, it is maintained at substantially zero. In the rising section D1, it rises on the negative side according to Expression 1 and Expression 2, in the flat section D2, the current value is substantially maintained at the current threshold $i_{thp}$, and in the falling section D3, the current value falls from the negative side according to the time constant of the circuit 131 (see FIG. 6).

The other points are similar to those of the third modification of the embodiment.

Figure 13:
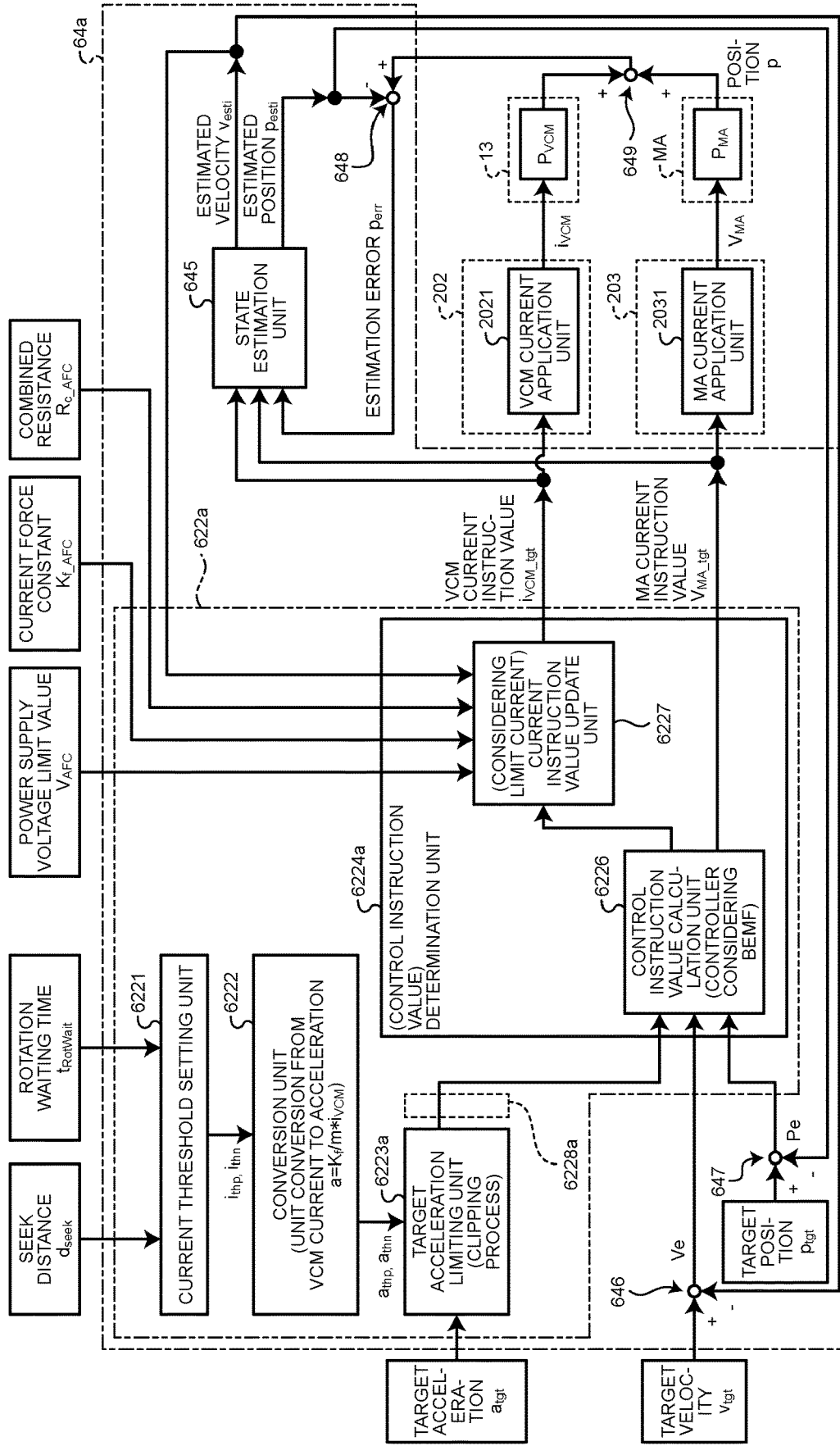
FIG. 13 is a diagram illustrating a configuration of a servo control unit in the fourth modification of the embodiment.

The third JIT seek control may be implemented in a servo control unit 64a as illustrated in FIG. 13. FIG. 13 is a diagram illustrating a functional configuration of the servo control unit 64a in the fourth modification of the embodiment.

The servo control unit 64a includes the JIT seek control unit 622a instead of the JIT seek control unit 622 (see FIG. 11). The JIT seek control unit 622a has a configuration similar to that of FIG. 12.

Note that the target acceleration $a_{tgt}$ clipped by the target acceleration limiting unit 6223a may not be smooth in the acceleration dimension. For example, it may vary discontinuously in the dimension of the first-order differential of the acceleration. In response, mechanical vibration of the head H can be caused. In this case, as indicated by dotted lines in FIGS. 12 and 13, the JIT seek control unit 622a may further include a smoothing filter 6228a.

The smoothing filter 6228a performs smoothing processing on the target acceleration $a_{tgt}$ clipped by the target acceleration limiting unit 6223a. The smoothing filter 6228a supplies the target acceleration $a_{tgt}$ after the smoothing processing to the control instruction value determination unit 6224a.

Thus, the target acceleration $a_{tgt}$ can be smoothed in the acceleration dimension, for example, can be made continuous in the dimension of the first-order differential of the acceleration, and the change in the current instruction value set by the control instruction value determination unit 6224a according to the target acceleration $a_{tgt}$ can be smoothed. Thus, the mechanical vibration of the head H can be suppressed.

The current instruction value update unit 6227 compares the absolute value of the current instruction value with the absolute value of the assumed limit current $i_{VCM\_AFC\_limit}$, and performs processing of updating the current instruction value to the assumed limit current $i_{VCM\_AFC\_limit}$ when the absolute value of the current instruction value exceeds the absolute value of the assumed limit current $i_{VCM\_AFC\_limit}$ (or a value obtained by subtracting a predetermined value from the absolute value), and this point is similar to the third modification of the embodiment.

FIGS. 12 and 13 illustrate the operation when the controller 3 performs the seek control illustrated in FIG. 9, but when the controller 3 performs the seek control illustrated in FIG. 7, the operation related to the current threshold $i_{thn}$ is omitted. Alternatively, when the controller 3 performs the seek control illustrated in FIG. 8, the operation related to the current threshold $i_{thp}$ is omitted.

Also with such a configuration, in the disk device 1, the AFC function can be enabled in the limit currents REF71 and REF72, and low power consumption can be achieved while maintaining access performance.

Fifth Modification of Embodiment

Figure 14:
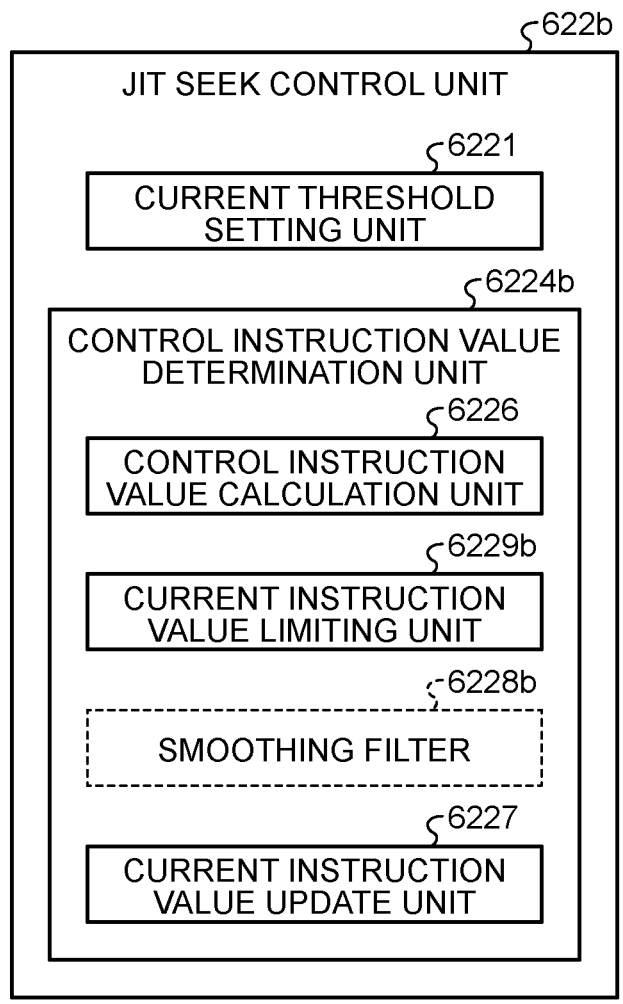
FIG. 14 is a diagram illustrating a functional configuration of a JIT seek control unit in a fifth modification of the embodiment.

The third JIT seek control may be implemented in a JIT seek control unit 622b as illustrated in FIG. 14. FIG. 14 is a diagram illustrating a functional configuration of the JIT seek control unit 622b in a fifth modification of the embodiment.

The JIT seek control unit 622b limits the current instruction value according to the current threshold and sets the current instruction value of the VCM 13.

The JIT seek control unit 622b, in which the conversion unit 6222 and the target acceleration limiting unit 6223a (see FIG. 12) are omitted, includes a control instruction value determination unit 6224b instead of the control instruction value determination unit 6224a (see FIG. 10). The control instruction value determination unit 6224b further includes a current instruction value limiting unit 6229b.

The current instruction value limiting unit 6229b receives the current instruction value from the control instruction value calculation unit 6226, receives the current threshold $i_{th}$ from the current threshold setting unit 6221, and performs a clipping process of the current instruction value using the current threshold $i_{th}$. For example, the current instruction value limiting unit 6229b clips a portion corresponding to the flat section A2 in the current instruction value with the current threshold $i_{thp}$, and clips a portion corresponding to the flat section D2 in the current instruction value with the current threshold $i_{thn}$. The current instruction value limiting unit 6229b supplies the current instruction value after the clipping process to the current instruction value update unit 6227.

The other points are similar to those of the fourth modification of the embodiment.

Figure 15:
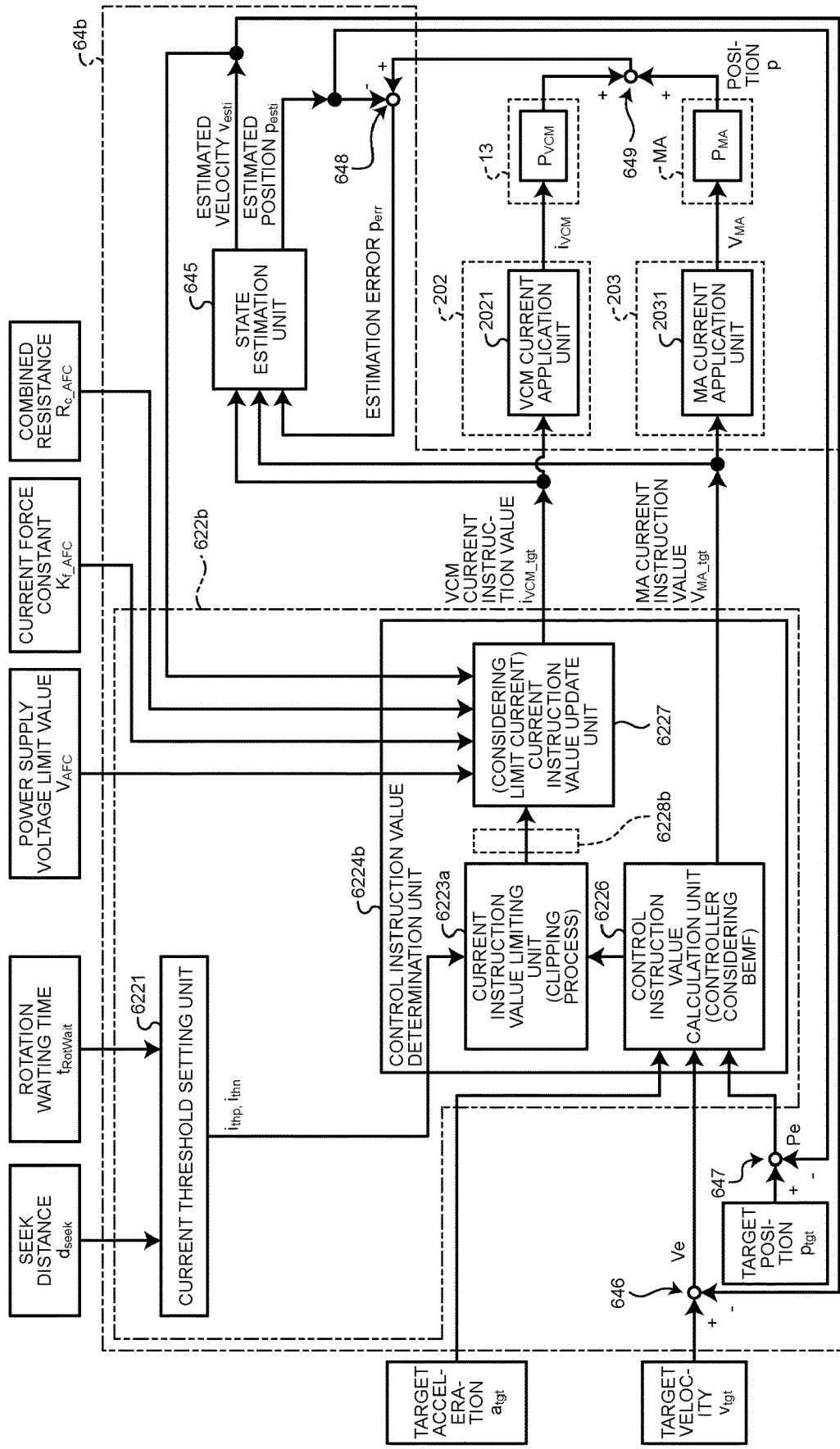
FIG. 15 is a diagram illustrating a configuration of a servo control unit in the fifth modification of the embodiment.

The third JIT seek control may be implemented in a servo control unit 64b as illustrated in FIG. 15. FIG. 15 is a diagram illustrating a functional configuration of the servo control unit 64b in the fifth modification of the embodiment.

The servo control unit 64a includes the JIT seek control unit 622b instead of the JIT seek control unit 622a (see FIG. 13). The JIT seek control unit 622b has a configuration similar to that of FIG. 14.

Note that the current instruction value clipped by the current instruction value limiting unit 6229b may not be smooth in the current dimension. For example, it may change discontinuously in the dimension of the first-order differential of the current. In response, mechanical vibration of the head H can be caused. In this case, as indicated by dotted lines in FIGS. 14 and 15, the control instruction value determination unit 6224b may further include a smoothing filter 6228b.

The smoothing filter 6228b performs smoothing processing on the current instruction value clipped by the current instruction value limiting unit 6229b. The smoothing filter 6228b supplies the current instruction value after the smoothing processing to the current instruction value update unit 6227.

Thus, the current instruction value can be smoothed in the current dimension, and can be continuous in the dimension of the first-order differential of the current, for example. Thus, the mechanical vibration of the head H can be suppressed.

The current instruction value update unit 6227 compares the absolute value of the current instruction value with the absolute value of the assumed limit current $i_{VCM\_AFC\_limit}$, and performs processing of updating the current instruction value to the assumed limit current $i_{VCM\_AFC\_limit}$ when the absolute value of the current instruction value exceeds the absolute value of the assumed limit current $i_{VCM\_AFC\_limit}$ (or a value obtained by subtracting a predetermined value from the absolute value), and this point is similar to the fourth modification of the embodiment.

FIGS. 14 and 15 illustrate the operation when the controller 3 performs the seek control illustrated in FIG. 9, but when the controller 3 performs the seek control illustrated in FIG. 7, the operation related to the current threshold $i_{thn}$ is omitted. Alternatively, when the controller 3 performs the seek control illustrated in FIG. 8, the operation related to the current threshold $i_{thp}$ is omitted.

Also with such a configuration, in the disk device 1, the AFC function can be enabled in the limit currents REF71 and REF72, and low power consumption can be achieved while maintaining access performance.

Sixth Modification of Embodiment

Figure 16:
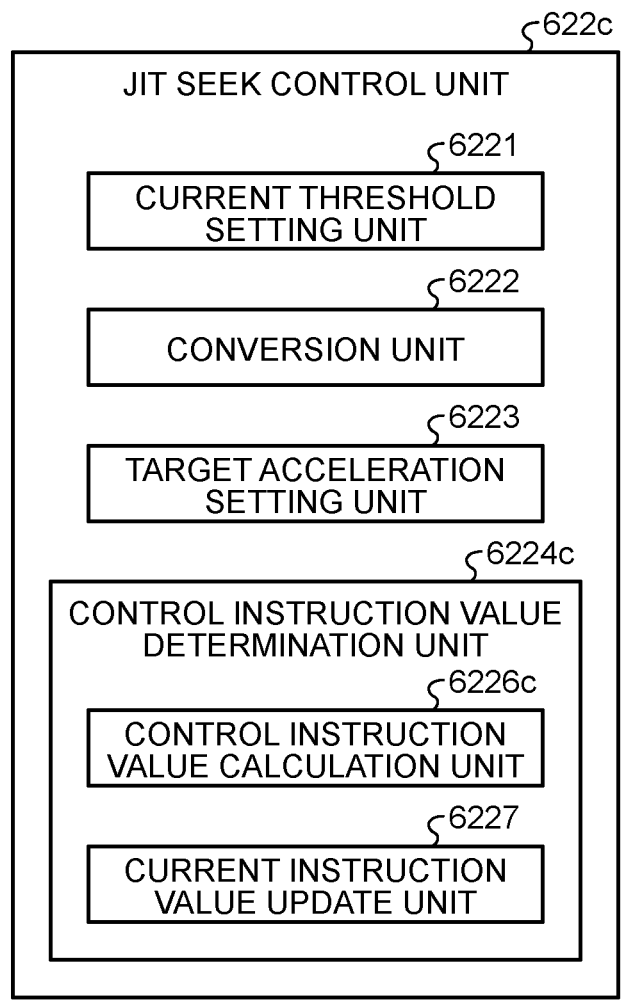
FIG. 16 is a diagram illustrating a functional configuration of a JIT seek control unit in a sixth modification of the embodiment.

The third JIT seek control may be implemented in a JIT seek control unit 622c as illustrated in FIG. 16. FIG. 16 is a diagram illustrating a functional configuration of the JIT seek control unit 622c in a sixth modification of the embodiment.

The JIT seek control unit 622c sets the target acceleration and sets the current instruction value of the VCM 13 in consideration of the target acceleration without considering the BEMF.

When the BEMF is not considered, the current $i_{VCM}$ of the VCM 13 in the rising section A1 and the flat section A2 illustrated in FIG. 3 can be expressed by the following Expression 1″.

$$V_{set} = R_C i_{VCM} + L_{VCM} \frac{di_{VCM}}{dt} \quad \text{Expression 1″}$$

The JIT seek control unit 622c includes a control instruction value determination unit 6224c in place of the control instruction value determination unit 6224 (see FIG. 10). In the control instruction value determination unit 6224c, the BEMF coefficient setting unit 6225 is omitted.

As the control instruction value calculation unit 6226c, a controller that does not consider the BEMF is used. The control instruction value calculation unit 6226c receives the target position $P_{tgt}$ and the target velocity $V_{tgt}$, and receives the target acceleration $a_{tgt}$ from the target acceleration setting unit 6223. The control instruction value calculation unit 6226c calculates the current instruction value of the VCM 13 using the target position $P_{tgt}$, the target velocity $V_{tgt}$, and the target acceleration $a_{tgt}$.

For example, the control instruction value calculation unit 6226c calculates the following current instruction value. In the rising section A1, it rises on the positive side according to Expression 1″, is maintained at substantially the current threshold $i_{thp}$ in the flat section A2, and falls from the positive side according to the time constant of the circuit 131 in the falling section A3. In the flat section C1, it is maintained at substantially zero. In the rising section D1, it rises on the negative side according to a mathematical expression in which the polarity of Expression 1″ is inverted, is substantially maintained at the current threshold $i_{thp}$ in the flat section D2, and falls from the negative side according to the time constant of the circuit 131 in the falling section D3 (see FIG. 6).

Figure 17:
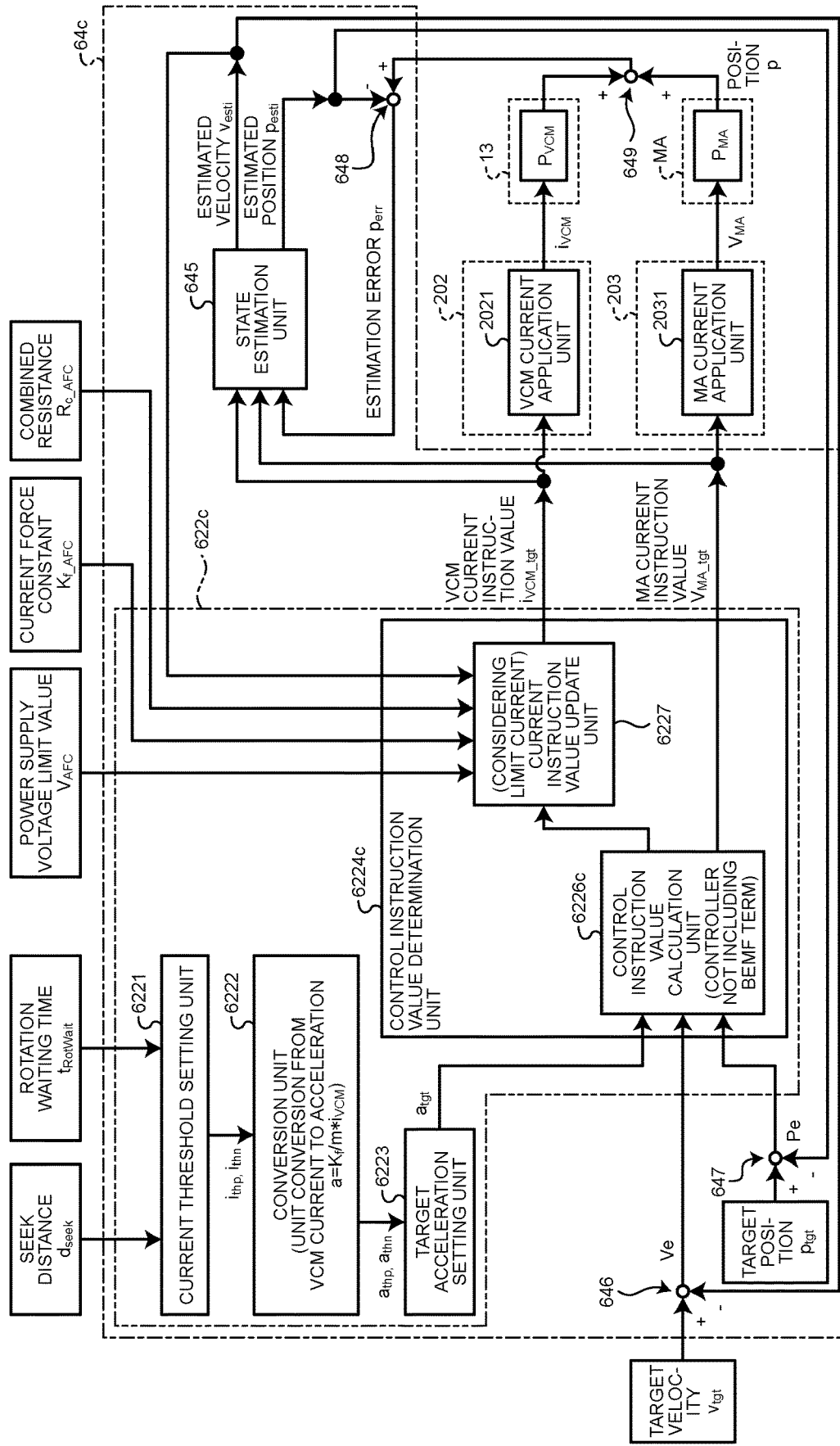
FIG. 17 is a diagram illustrating a configuration of a servo control unit in the sixth modification of the embodiment.

The third JIT seek control may be implemented in a servo control unit 64c as illustrated in FIG. 17. FIG. 17 is a diagram illustrating a functional configuration of the servo control unit 64c in the sixth modification of the embodiment.

The servo control unit 64c includes the JIT seek control unit 622c instead of the JIT seek control unit 622 (see FIG. 10). The JIT seek control unit 622c has a configuration similar to that of FIG. 16.

The current instruction value update unit 6227 compares the absolute value of the current instruction value with the absolute value of the assumed limit current $i_{VCM\_AFC\_limit}$, and performs processing of updating the current instruction value to the assumed limit current $i_{VCM\_AFC\_limit}$ when the absolute value of the current instruction value exceeds the absolute value of the assumed limit current $i_{VCM\_AFC\_limit}$ (or a value obtained by subtracting a predetermined value from the absolute value), and this point is similar to the third modification of the embodiment.

FIGS. 16 and 17 illustrate the operation when the controller 3 performs the seek control illustrated in FIG. 9, but when the controller 3 performs the seek control illustrated in FIG. 7, the operation related to the current threshold $i_{thn}$ is omitted. Alternatively, when the controller 3 performs the seek control illustrated in FIG. 8, the operation related to the current threshold $i_{thp}$ is omitted.

Also with such a configuration, in the disk device 1, the AFC function can be enabled in the limit currents REF71 and REF72, and low power consumption can be achieved while maintaining access performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a head;
a disk having a recording surface;
a motor that causes the head to seek along the recording surface; and
a controller that controls the motor, wherein
the controller, when a rotation waiting time is absent from when the head reaches a target track of the disk to when the head reaches a target sector, increases an absolute value of a motor current in a first section in a first period in which the head is accelerated or decelerated, changes the absolute value of the motor current at a first average change rate in a second section after the first section in the first period, and decreases the absolute value of the motor current at a second average change rate that is steeper than the first average change rate in a third section after the second section in the first period, and
the controller, when the rotation waiting time is present, increases the absolute value of the motor current in a fourth section in a second period in which the head is accelerated or decelerated, changes the absolute value of the motor current at a third average change rate in a fifth section after the fourth section in the second period, decreases the absolute value of the motor current at a fourth average change rate steeper than the third average change rate in a sixth section after the fifth section in the second period, and decreases the absolute value of the motor current at a fifth average change rate steeper than the fourth average change rate in a seventh section after the sixth section in the second period.

2. The disk device according to claim 1, wherein the controller estimates a limit current in consideration of a counter electromotive voltage, and when the rotation waiting time is present, the controller decreases the absolute value of the motor current at the fourth average change rate along a change in an absolute value of the limit current in the sixth section.

3. The disk device according to claim 2, wherein the controller estimates a limit current in consideration of a counter electromotive voltage, and when the rotation waiting time is present, the controller generates a current instruction value in the second period, corrects the current instruction value in the sixth section in which the limit current is exceeded by replacing the current instruction value with the limit current, and drives the motor with the corrected current instruction value in the second period.

4. The disk device according to claim 2, wherein the controller estimates a limit current in consideration of a counter electromotive voltage, and when the rotation waiting time is present, the controller generates a current instruction value in the second period, corrects the current instruction value in the sixth section in which the limit current is exceeded by replacing the current instruction value with a value obtained by adding a predetermined value to the limit current, and drives the motor with the corrected current instruction value in the second period.

5. The disk device according to claim 2, wherein the controller changes the absolute value of the motor current at the third average change rate closer to zero than the average change rate of the change in the absolute value of the limit current in the fifth section.

6. The disk device according to claim 5, wherein the third average change rate is substantially zero.

7. The disk device according to claim 2, wherein the controller estimates the limit current $i_{VCM\_limit}$ by $$i_{VCM\_limit}=(V-V_{BEMF})/R$$

where V is a power supply voltage, $V_{BEMF}$ is a counter electromotive voltage, and R is a circuit resistance of the motor.

8. The disk device according to claim 7, wherein the controller uses a measured power supply voltage or a power supply voltage designed for a worst condition as the power supply voltage V.

9. The disk device according to claim 7, wherein the controller uses R estimated by $$R=(V-V_{BEMF})/i_{VCM}$$

where V is a power supply voltage, $V_{BEMF}$ is a counter electromotive voltage, and $i_{VCM}$ is a motor current in the sixth section as a circuit resistance R of the motor.

10. The disk device according to claim 7, wherein the controller uses $V_{BEMF}$ estimated by $$V_{BEMF}=vKf$$

where v is a measured counter electromotive voltage or a radial velocity of the head, and Kf is a current force constant, as a counter electromotive voltage $V_{BEMF}$.

11. The disk device according to claim 7, wherein the controller uses, as the radial velocity v of the head, a velocity estimated from a differential of a position demodulated by servo information read from the disk by the head or the demodulated position and a current instruction value.

12. The disk device according to claim 9, wherein the controller uses, as the motor current $i_{VCM}$, a measured current, a current estimated by multiplying a second-order differential of a position demodulated from servo information read from the disk by the head by an acceleration current conversion coefficient, or a current estimated by multiplying an acceleration estimated from the demodulated position and a current instruction value by the acceleration current conversion coefficient.

13. The disk device according to claim 10, wherein the controller uses, as the circuit resistance R of the motor, R corrected in consideration of continuous heat dissipation and heat generation due to operation of the motor between a time at which the estimated R is measured and a time at which the estimated R is used.

14. The disk device according to claim 1, wherein the second period is a period in which the head is accelerated.

15. The disk device according to claim 1, wherein the second period is a period in which the head is decelerated.

16. The disk device according to claim 14, wherein the controller increases the absolute value of the motor current in an eighth section in a third period in which the head is decelerated, changes the absolute value of the motor current at a sixth average change rate in a ninth section after the eighth section in the third period, decreases the absolute value of the motor current at a seventh average change rate that is steeper than the sixth average change rate in a tenth section after the ninth section in the third period, and decreases the absolute value of the motor current at an eighth average change rate that is steeper than the seventh average change rate in an eleventh section after the tenth section in the third period.

17. The disk device according to claim 16, wherein
the controller estimates a limit current in consideration of a counter electromotive voltage, and when the rotation waiting time is present, the controller decreases the absolute value of the motor current at the fourth average change rate along a change in the absolute value of the limit current in the sixth section, and decreases the absolute value of the motor current at the seventh average change rate along a change in the absolute value of the limit current in the tenth section.

18. The disk device according to claim 17, wherein
the controller estimates a limit current in consideration of a counter electromotive voltage, and when the rotation waiting time is present, the controller generates a current instruction value in the second period, corrects the current instruction value in the sixth section in which the limit current is exceeded by replacing the current instruction value with the limit current, drives the motor with the corrected current instruction value in the second period, generates a current instruction value in the third period, corrects the current instruction value in the tenth section in which the limit current is exceeded by replacing the current instruction value with the limit current, and drives the motor with the corrected current instruction value in the third period.

19. The disk device according to claim 17, wherein
the controller estimates a limit current in consideration of a counter electromotive voltage, and when the rotation waiting time is present, the controller generates a current instruction value in the second period, corrects the current instruction value in the sixth section in which the limit current is exceeded by replacing the current instruction value with a value obtained by adding a predetermined value to the limit current, drives the motor with the corrected current instruction value in the second period, generates a current instruction value in the third period, corrects the current instruction value in the tenth section in which the limit current is exceeded by replacing the current instruction value with a value obtained by adding a predetermined value to the limit current, and drives the motor with the corrected current instruction value in the third period.

20. The disk device according to claim 17, wherein
the controller changes the absolute value of the motor current at the third average change rate closer to zero than an average change rate of the change in the absolute value of the limit current in the fifth section, and changes the absolute value of the motor current at the sixth average change rate closer to zero than an average change rate of the change in the absolute value of the limit current in the ninth section.

* * * * *